(12) United States Patent
Ishikawa

(10) Patent No.: US 9,674,421 B2
(45) Date of Patent: Jun. 6, 2017

(54) FOCUS DETECTION APPARATUS, IMAGE CAPTURING APPARATUS, AND FOCUS DETECTION METHOD

(71) Applicant: CANON KABUSHIKI KAISHA, Tokyo (JP)

(72) Inventor: Daisuke Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 14/679,397

(22) Filed: Apr. 6, 2015

(65) Prior Publication Data

US 2015/0296129 A1    Oct. 15, 2015

(30) Foreign Application Priority Data

Apr. 9, 2014   (JP) ................. 2014-080494

(51) Int. Cl.
*H04N 5/232*   (2006.01)
*H04N 5/369*   (2011.01)

(52) U.S. Cl.
CPC ....... *H04N 5/23212* (2013.01); *H04N 5/3696* (2013.01)

(58) Field of Classification Search
None
See application file for complete search history.

(56) References Cited

U.S. PATENT DOCUMENTS 4,410,804 A    10/1983   Stauffer

FOREIGN PATENT DOCUMENTS

JP    2001-083407 A    3/2001

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

A focus detection apparatus detects a focus state of a subject using first and second pixel signals obtained by performing photoelectric conversion on subject light beams which have passed through different pupil regions of an imaging optical system. The focus state of a subject is detected from the first and second pixel signals. Further, each of the first pixel signals and second pixel signals are added by a predetermined addition number, and then the added first pixel signals and second pixel signals are relatively shifted. Thereafter, an evaluation value is calculated based on a signal obtained by adding the shifted first pixel signals and the second pixel signals and a defocus amount is detected from the evaluation value. The predetermined addition number is set in accordance with the focus state.

13 Claims, 17 Drawing Sheets

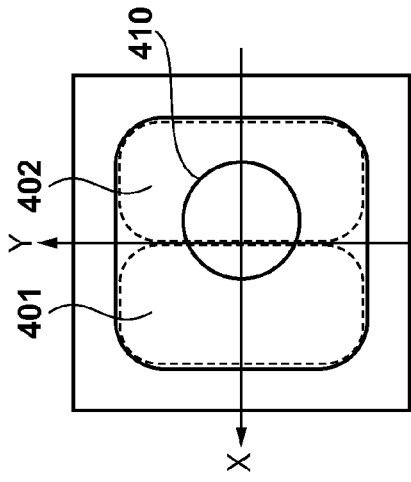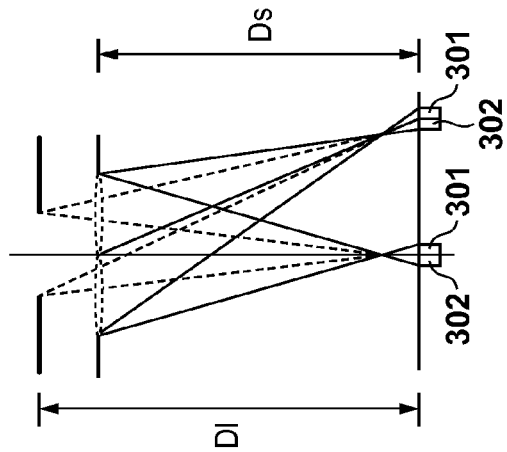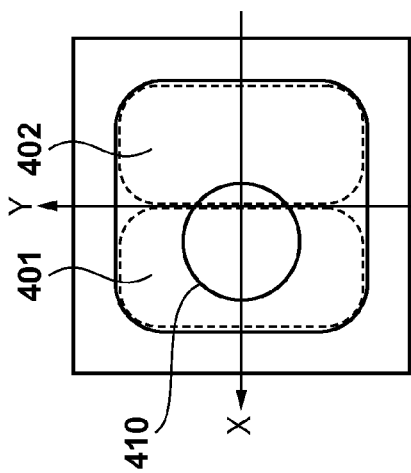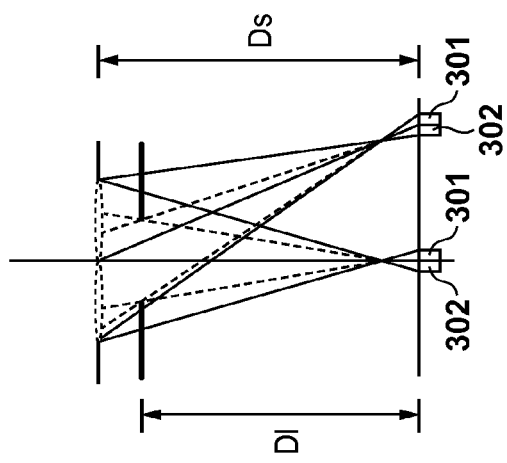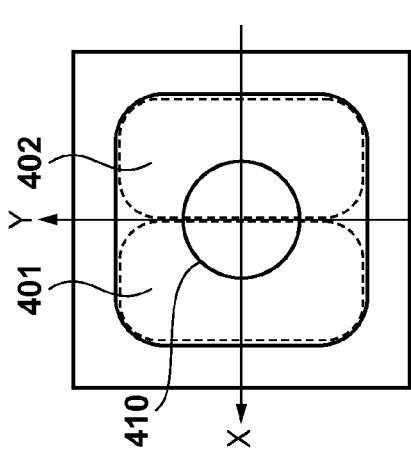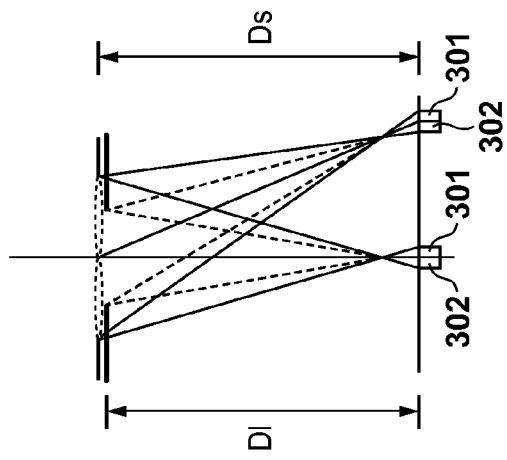
FIG. 8A  FIG. 8B  FIG. 8C

---- FIRST FOCUS DETECTION SIGNAL
—— SECOND FOCUS DETECTION SIGNAL

---- FIRST FOCUS DETECTION SIGNAL
—— SECOND FOCUS DETECTION SIGNAL

- - - FIRST FOCUS DETECTION SIGNAL
— SECOND FOCUS DETECTION SIGNAL

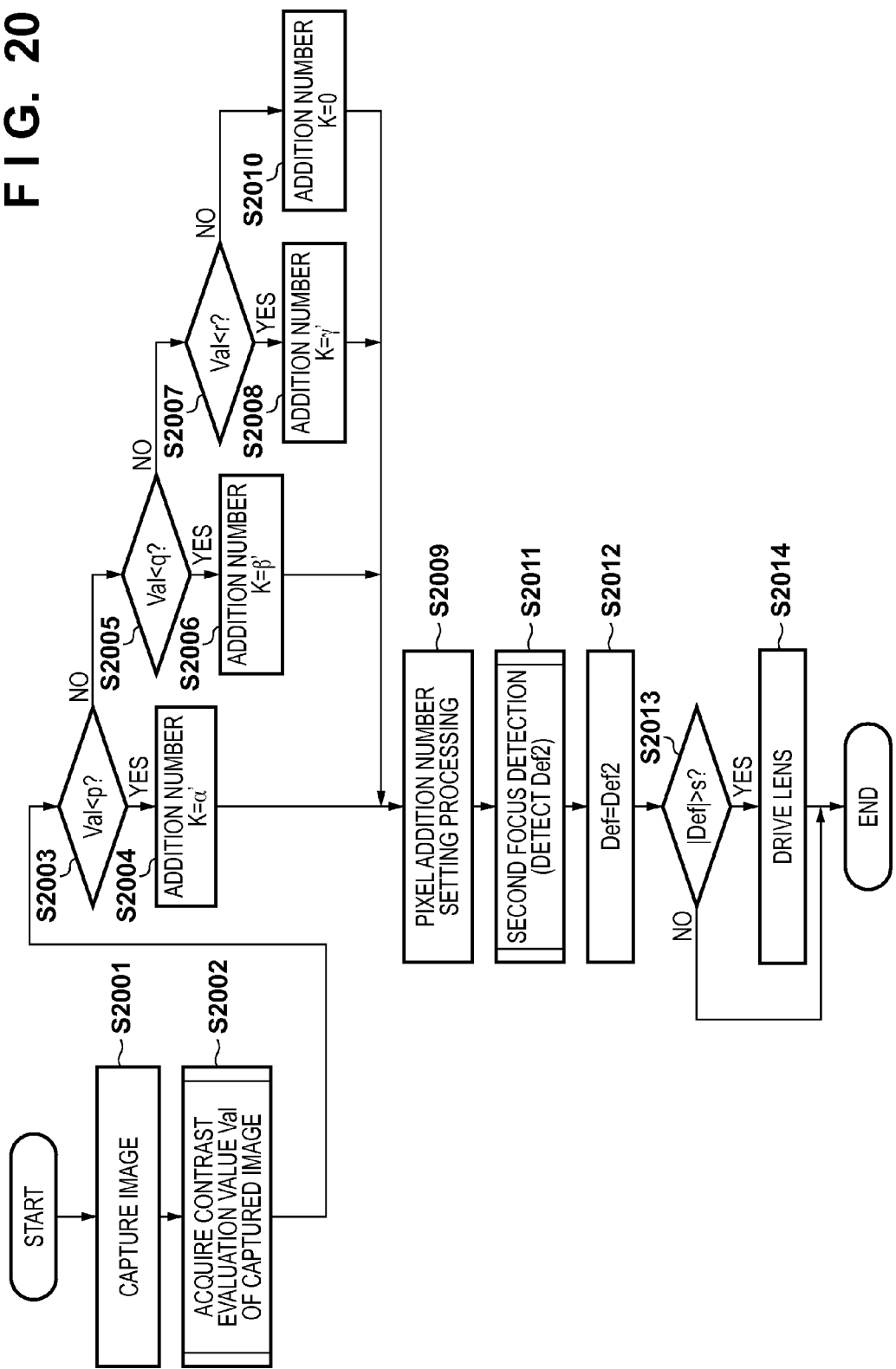

FOCUS DETECTION APPARATUS, IMAGE CAPTURING APPARATUS, AND FOCUS DETECTION METHOD

BACKGROUND OF THE INVENTION

Field of the Invention

The present invention relates to a focus detection apparatus, an image capturing apparatus having the focus detection apparatus, and a focus detection method.

Description of the Related Art

As a focus detection method performed in an image capturing apparatus, an on-imaging plane phase difference method is used in which focus detection by a phase difference method is performed using focus detection pixels formed in an image sensor. In the focus detection by the on-imaging plane phase difference method, the defocusing direction and the defocus amount can be simultaneously detected by the focus detection pixels formed in the image sensor, and focus control can be performed at a high speed.

U.S. Pat. No. 4,410,804 discloses an image capturing apparatus using a two-dimensional image sensor in which one microlens and a plurality of photoelectric conversion portions are formed in each pixel. The plurality of photoelectric conversion portions are configured to receive light components that have passed through different regions of the exit pupil of an imaging lens via one microlens, thereby dividing the pupil. A correlation amount is calculated from focus detection signals output from pixels (focus detection pixels) each including a plurality of photoelectric conversion portions, and an image shift amount is obtained from the correlation amount, thereby performing focus detection by the phase difference method. Japanese Patent Laid-Open No. 2001-083407 discloses generating an image signal by adding focus detection signals output from a plurality of photoelectric conversion portions for each pixel.

However, in the on-imaging plane phase difference method, the light beam received by the focus detection pixel for acquiring focus detection signals is different from the light beam received by an imaging pixel for acquiring an image. For this reason, the influence of aberrations (spherical aberration, astigmatism, coma aberration, etc.) of the imaging lens on the focus detection signal is different from the influence thereof on an image signal. Therefore, a problem arises in that a difference occurs between a detected in-focus position calculated from the focus detection signal and a best in-focus position for the image signal.

SUMMARY OF THE INVENTION

The present invention has been made in consideration of the above situation, and enables accurate focus detection to be performed, while suppressing a difference between a detected in-focus position calculated from a focus detection signal and a best in-focus position for an image signal and saving processing resources of an apparatus for focus detection.

According to the present invention, provided is a focus detection apparatus that detects a focus state of a subject using first pixel signals and second pixel signals obtained by performing photoelectric conversion on subject light beams which have passed through different pupil regions of an imaging optical system for forming an optical image of the subject, the focus detection apparatus comprising: a first detection unit configured to detect the focus state of the subject from the first pixel signals and second pixel signals; an addition unit configured to add each of the first pixel signals and second pixel signals by a predetermined addition number; a calculation unit configured to relatively shift the first pixel signals and second pixel signals that have undergone the addition by the addition unit, and calculate an evaluation value based on a contrast of a signal obtained by adding the first pixel signals and the second pixel signals after being shifted; and a second detection unit configured to detect a defocus amount from the evaluation value, wherein the addition unit sets the predetermined addition number in accordance with the focus state detected by the first detection unit.

Further, according to the present invention, provided is an image capturing apparatus comprising: an image sensing unit configured to perform photoelectric conversion on subject light beams that have passed through different pupil regions of an imaging optical system for forming an optical image of the subject, and output a first and second image signals; and the focus detection apparatus described above.

Furthermore, according to the present invention, provided is a focus detection method for detecting a focus state of a subject using first pixel signals and second pixel signals obtained by performing photoelectric conversion on subject light beams which have passed through different pupil regions of an imaging optical system for forming an optical image of the subject, the focus detection method comprising: detecting the focus state of the subject from the first pixel signals and second pixel signals; adding each of the first pixel signals and second pixel signals by a predetermined addition number; relatively shifting the first pixel signals and second pixel signals that have undergone the addition in the addition step, and calculating an evaluation value based on a contrast of a signal obtained by adding the first pixel signals and the second pixel signals after being shifted; and detecting a defocus amount from the evaluation value, wherein, in the adding step, the predetermined addition number is set in accordance with the focus state detected in the former detecting step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 8A to 8C are schematic explanatory views of shading of the first focus detection signal and the second focus detection signal caused by a shift of a pupil according to the embodiment;

FIG. 20 is a flowchart showing focus detection processing according to a second embodiment.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Hereinafter, a first embodiment of the present invention will be described. In the first embodiment, it is assumed that a main subject region is determined from a captured image, and focus control is performed based on an evaluation signal of an evaluation region.

[Overall configuration]

Figure 1:
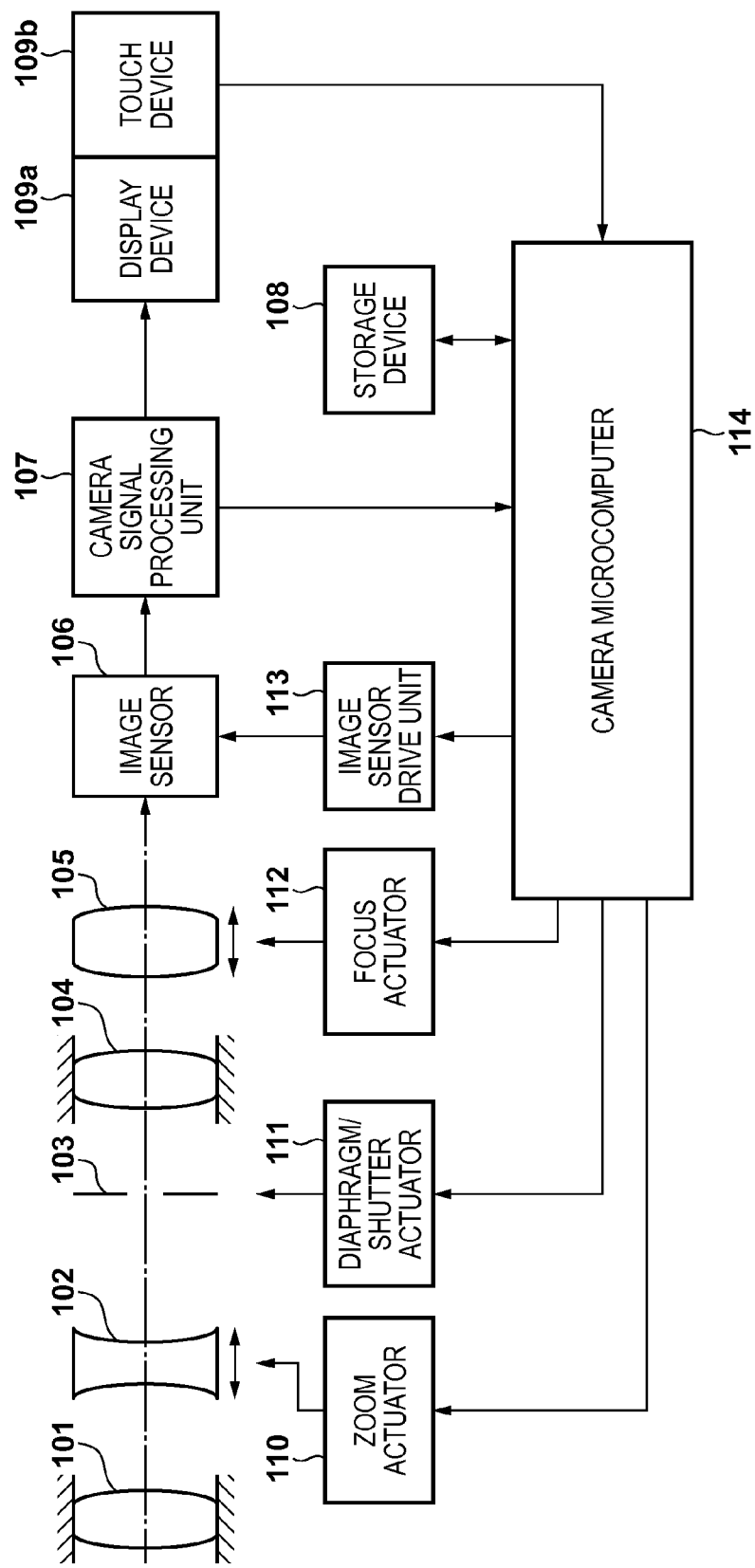
FIG. 1 is a schematic block diagram of an image capturing apparatus according to an embodiment of the present invention.

FIG. 1 is a diagram showing a brief configuration of a video camera (image capturing apparatus) as an example having an image processing apparatus according to an embodiment of the present invention. Note that, although the video camera will be described in this embodiment, the present invention is also applicable to other image capturing apparatuses, such as a digital still camera. As described later, the image capturing apparatus according to this embodiment is an apparatus that has an image sensor having a microlens which divides an exit pupil of an imaging optical system and is capable of performing focus control by an on-imaging plane phase difference method.

In FIG. 1, a first group lens 101 is arranged in a fixed manner at a tip of an imaging optical system that forms an optical image of a subject. A variable magnification lens group 102 realizes a magnification change effect (zoom function) by reciprocally moving in an optical axis direction. A diaphragm 103 adjusts the amount of light at the time of photographing by adjusting the aperture thereof. A focus lens 105 performs focus control by reciprocally moving in the optical axis direction. A second group lens 104 is arranged in a fixed manner between the diaphragm 103 and the focus lens 105. An image sensor 106 includes a two-dimensional CMOS photosensor and a peripheral portion, and is arranged on an image forming plane of the imaging optical system. A camera signal processing unit 107 performs γ conversion, color interpolation processing, and the like on an image signal generated by the image sensor 106. A storage device 108 stores a moving image and a still image that have been taken in a predetermined recording format, in a removable storage medium such as a flash memory, for example.

A display device 109a is constituted by an LCD or the like, for example, and displays information regarding an image shooting mode of the camera, a preview image before shooting an image, an image for a check after shooting an image, a focus state display image at the time of focus detection, and the like. A touch device 109b is arranged so as to be laid over the display device 109a and the like, and enables various operations to the image capturing apparatus main body to be performed.

A zoom actuator 110 reciprocally moves the variable magnification lens group 102 in the optical axis direction and performs a magnification change operation in order to realize the magnification change effect. A diaphragm/shutter actuator 111 controls the aperture of the diaphragm 103 to adjust the amount of light for shooting an image, and controls the exposure time at the time of photographing. A focus actuator 112 reciprocally moves the focus lens 105 in the optical axis direction in order to perform focus control. An image sensor drive unit 113 controls an image shooting operation of the image sensor 106.

A camera microcomputer 114 is an in-camera CPU that governs various kinds of control of the image capturing apparatus main body, and has a calculation unit, a ROM, a RAM, an A/D converter, a D/A converter, a communication interface unit, and the like. The camera microcomputer 114 loads and executes a predetermined program stored in the ROM, and thereby drives each part of the image capturing apparatus and executes a series of operations such as AF, image shooting, image processing, and recording. The camera microcomputer 114 constitutes a focus control device in the present invention together with the later-described camera signal processing unit 107, and governs the control of signal processing and the driving of the imaging optical system for focus control.

[Image Sensor]

Figure 2:
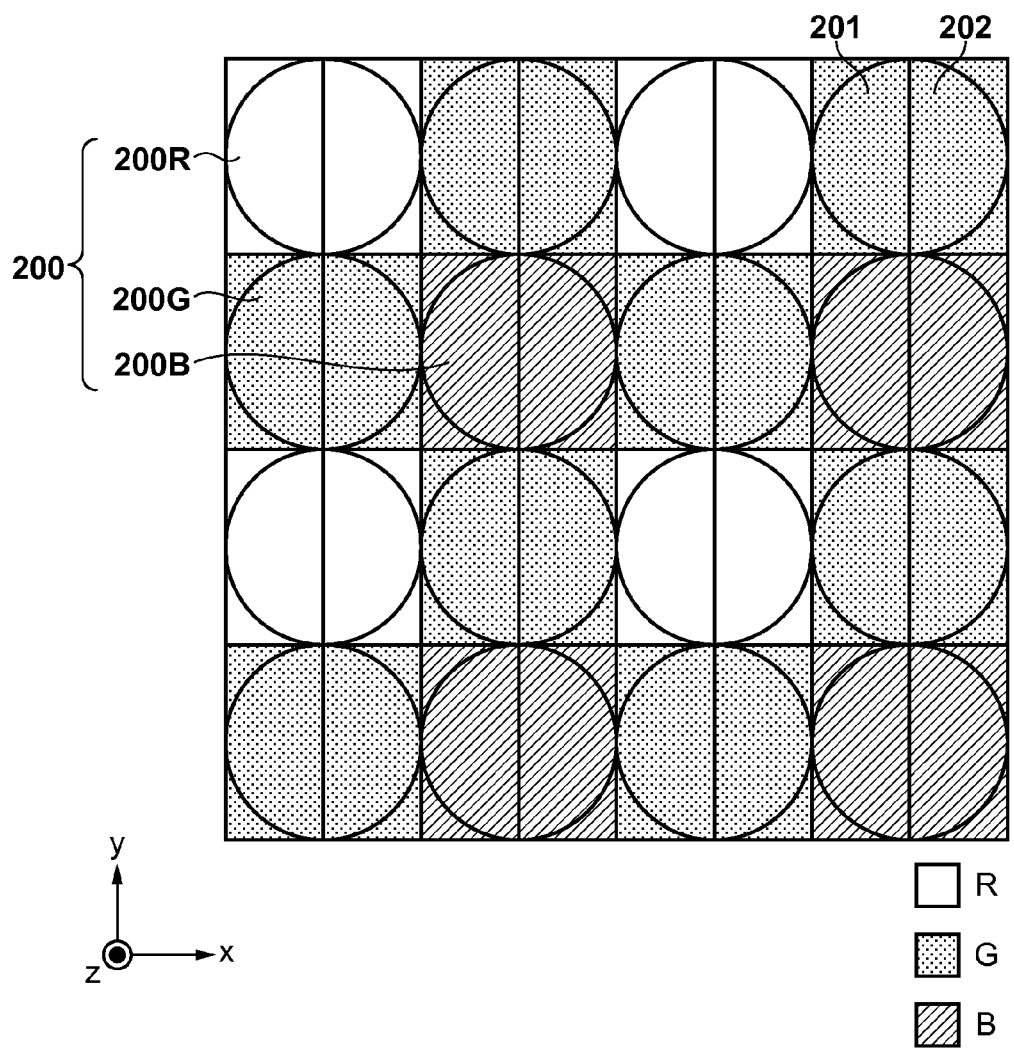
FIG. 2 is a schematic view of a pixel array of an image sensor according to the embodiment.

FIG. 2 shows a pixel arrangement of the image sensor 106 according to the embodiment. FIG. 2 illustrates an imaging pixel array within the range of 4 columns×4 rows (i.e., a focus detection pixel array within the range of 8 columns×4 rows) in a two-dimensional CMOS sensor used as the image sensor 106 according to the embodiment.

In the embodiment, a pixel group 200 includes pixels of 2 columns×2 rows. In each pixel group 200, a pixel 200R having an R (red) spectral sensitivity is arranged at the upper left position, pixels 200G having a G (green) spectral sensitivity are arranged at the upper right and lower left positions, and a pixel 200B having a B (blue) spectral sensitivity is arranged at the lower right position. Each pixel is formed from a first focus detection pixel 201 and a second focus detection pixel 202 arrayed in 2 columns×1 row.

A number of arrays of 4 columns×4 rows pixels (i.e., 8 columns×4 rows focus detection pixels) shown in FIG. 2 are arranged in the image sensor 106 to enable capturing of an image signal and focus detection signals. In the embodiment, the image sensor will be described assuming that a period P of pixels is 4 μm, the number N of pixels is 5,575 columns in horizontal direction×3,725 rows in vertical direction=about 20,750,000, a column-direction period PAF of focus detection pixels is 2 μm, and the number NAF of focus detection pixels is 11,150 columns in horizontal direction×3,725 rows in vertical direction=about 41,500,000.

Figure 3A:
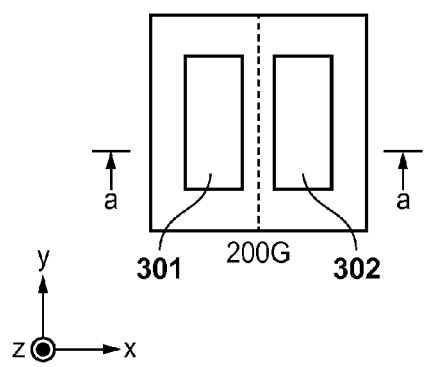
FIGS. 3A and 3B are a schematic plan view and a schematic sectional view, respectively, of a pixel according to the embodiment.
Figure 3B:
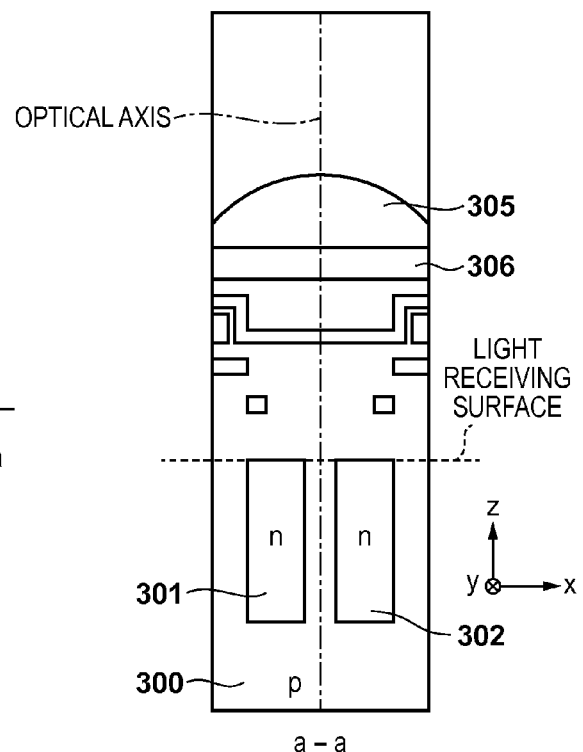

FIG. 3A is a plan view of one pixel 200G of the image sensor 106 shown in FIG. 2 when viewed from the light receiving surface side (+z side) of the image sensor 106, and FIG. 3B is a sectional view showing the a-a section in FIG. 3A viewed from the −y side. As shown in FIGS. 3A and 3B, in the pixel 200G according to this embodiment, a microlens 305 for condensing incident light is formed on the light receiving side of each pixel. The pixel is divided by NH (here, divided by two) in the x direction and divided by HV (here, divided by one, or not divided) in the y direction to form n-type photoelectric conversion portions 301 and 302 in a p-type substrate 300. The photoelectric conversion portions 301 and 302 correspond to the first focus detection pixel 201 and the second focus detection pixel 202, respectively. Each of the photoelectric conversion portions 301 and 302 may be formed as a pin structure photodiode including an intrinsic layer between a p-type layer and an n-type layer or a p-n junction photodiode without an intrinsic layer, as needed.

In each pixel, a color filter 306 is formed between the microlens 305 and the photoelectric conversion portions 301 and 302. The spectral transmittance of the color filter may be changed between the focus detection pixels, as needed, or the color filter may be omitted.

Light that has entered the pixel 200G shown in FIGS. 3A and 3B is condensed by the microlens 305, spectrally split by the color filter 306, and received by the photoelectric conversion portions 301 and 302. In the photoelectric conversion portions 301 and 302, electron-hole pairs are produced in accordance with the received light amount and separated in the depletion layer. Electrons having negative charges are accumulated in the n-type layers (not shown). On the other hand, holes are discharged externally from the image sensor 106 through the p-type layers connected to a constant voltage source (not shown). The electrons accumulated in the n-type layers (not shown) of the photoelectric conversion portions 301 and 302 are transferred to electrostatic capacitances (FDs) through transfer gates, converted into voltage signals, and output.

Figure 4:
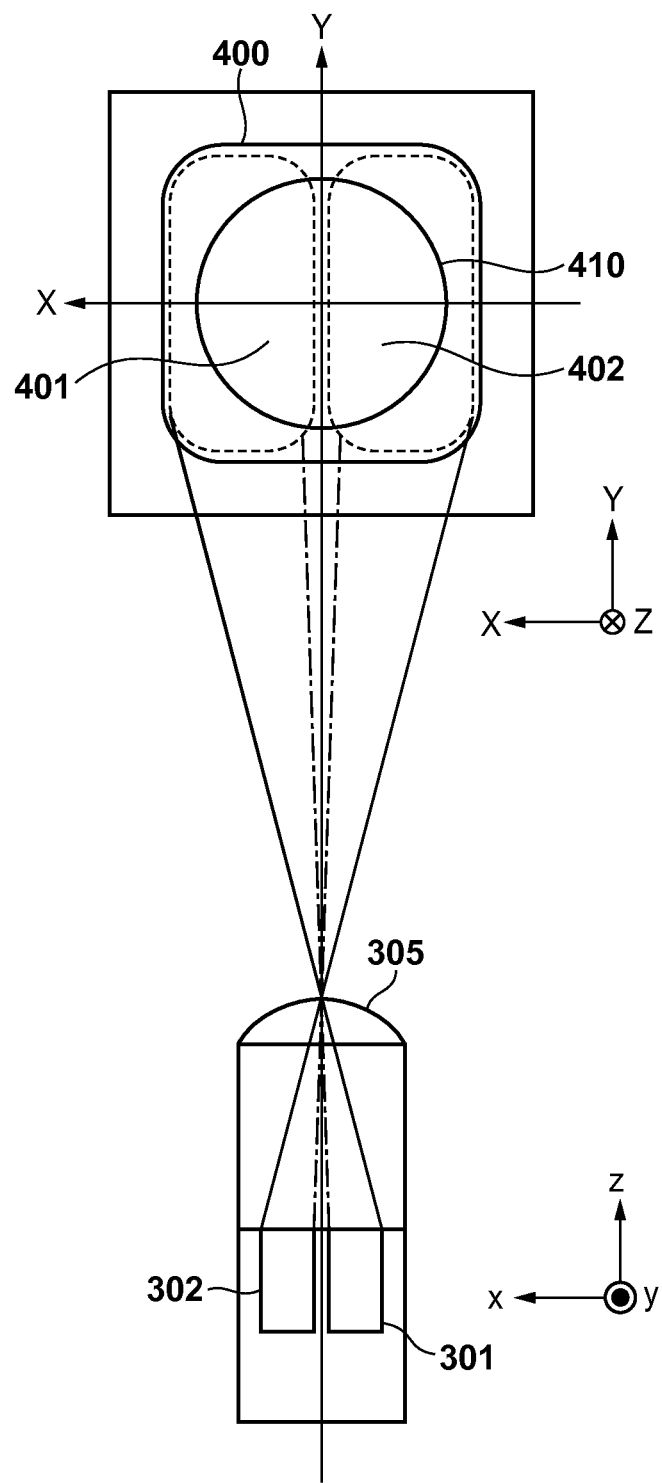
FIG. 4 is a schematic explanatory view of a pixel structure and pupil division according to the embodiment.

The correspondence between pupil division and the pixel structure according to this embodiment shown in FIGS. 3A and 3B will be described with reference to FIG. 4. FIG. 4 illustrates a sectional view showing the a-a section of the pixel structure according to the first embodiment shown in FIG. 3A viewed from the +y side and the exit pupil plane of an imaging optical system. Note that in FIG. 4, to obtain correspondence with the coordinate axes of the exit pupil plane, the x- and y-axes of the sectional view are reversed with respect to those of FIGS. 3A and 3B. In FIG. 4, the same constituent elements as those in FIGS. 3A and 3B are given the same reference numerals.

As shown in FIG. 4, a first partial pupil region 401 of the first focus detection pixel 201 represents a pupil region that is almost conjugate with the light receiving surface of the photoelectric conversion portion 301 having a center of gravity decentered in the −x direction via the microlens 305, and light beams that have passed through the first partial pupil region 401 are received by the first focus detection pixel 201. The first partial pupil region 401 of the first focus detection pixel 201 has a center of gravity decentered to the +X side on the pupil plane. Further, a second partial pupil region 402 of the second focus detection pixel 202 represents a pupil region that is almost conjugate with the light receiving surface of the photoelectric conversion portion 302 having a center of gravity decentered in the +x direction via the microlens 305, and light beams that have passed through the second partial pupil region 402 are received by the second focus detection pixel 202. The second partial pupil region 402 of the second focus detection pixel 202 has a center of gravity decentered to the −X side on the pupil plane. Light beams that have passed through a pupil region 400 are received by the whole pixel 200G including the photoelectric conversion portions 301 and 302 (first focus detection pixel 201 and the second focus detection pixel 202).

Figure 5:
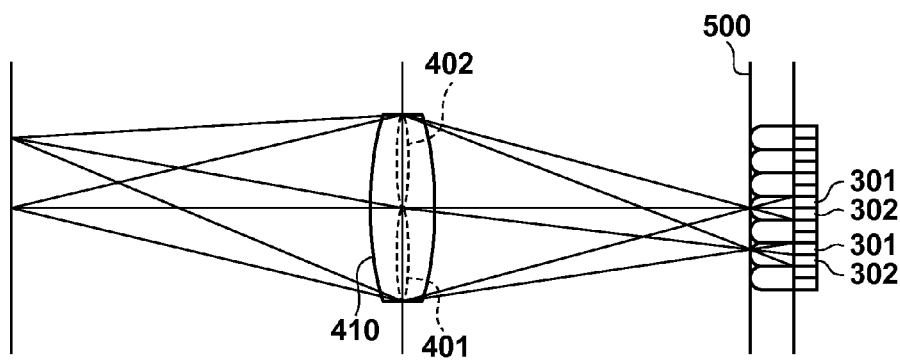
FIG. 5 is a schematic explanatory view of pupil division with an imaging optical system and an image sensor according to the embodiment.

The schematic correspondence between the image sensor 106 and pupil division by the microlens 305 according to the embodiment is shown in FIG. 5. Light beams that have passed through different pupil regions, namely, the first partial pupil region 401 and the second partial pupil region 402 of the exit pupil 410 enter the pixels of the image sensor 106 at different incidence angles and are received by the photoelectric conversion portions 301 and 302 divided into 2×1 parts. In this embodiment, the pupil region is divided into two parts in the horizontal direction. However, the pupil may be divided in the vertical direction, as needed.

As described above, the image sensor 106 used in this embodiment has the following configuration. That is to say, the image sensor 106 has the first focus detection pixels 201 that receives a light beam passing through the first partial pupil region 401 of the imaging optical system, and the second focus detection pixels 202 that receives a light beam passing through the second partial pupil region 402, which is different from the first partial pupil region 401, of the imaging optical system. Note that, in the image sensor 106 in this embodiment, each imaging pixel is constituted by the first focus detection pixel 201 and the second focus detection pixel 202. However, the imaging pixel, the first focus detection pixel 201, and the second focus detection pixel 202 may have separate pixel configurations as necessary. In this case, a configuration may be employed in which the first focus detection pixels and the second focus detection pixels are arranged in a part of the array of the imaging pixels that receive light beams which have passed through a pupil region, which is a combination of the first partial pupil region 401 and the second partial pupil region 402 of the imaging optical system.

In this embodiment, pixel signals from the first focus detection pixels 201 in respective pixels of the image sensor 106 are collected to generate a first focus detection signal, pixel signals from the second focus detection pixels 202 in respective pixels are collected to generate a second focus detection signal, and focus detection is performed. An imaging signal (captured image) having a resolution of the effective pixel number N is generated by adding signals obtained from the first focus detection pixel 201 and the second focus detection pixel 202 at every pixel of the image sensor 106.

[Relationship Between Defocus Amount and Image Shift Amount]

Figure 6:
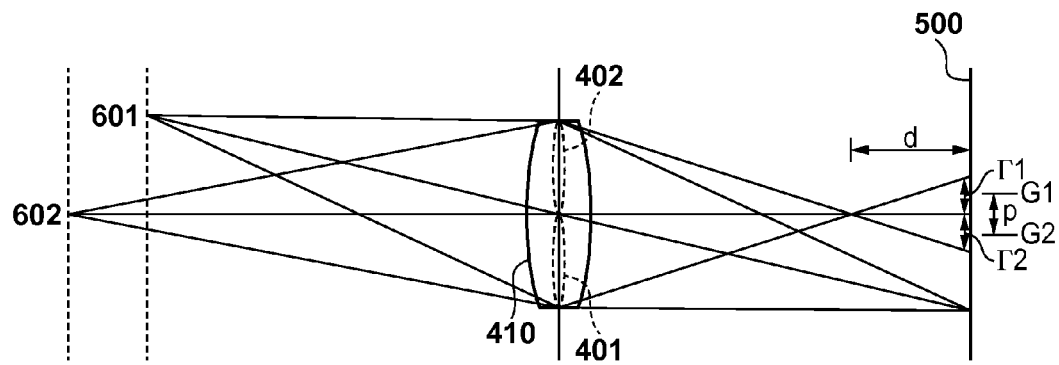
FIG. 6 is a schematic diagram showing a relationship between a defocus amount and an image shift amount between a first focus detection signal and a second focus detection signal according to the embodiment.

Next, a description will be given of a relationship between an image shift amount and a defocus amount of the first focus detection signal and the second focus detection signal acquired by the image sensor 106 in this embodiment. FIG. 6 is a diagram showing a relationship between a defocus amount of the first focus detection signal and the second focus detection signal and an image shift amount between the first focus detection signal and the second focus detection signal. The image sensor 106 (not shown) in this embodiment is arranged on the imaging plane 500, and the exit pupil 410 of the imaging optical system is divided into two regions, i.e., the first partial pupil region 401 and the second partial pupil region 402, as in FIGS. 4 and 5. Note that, in FIG. 6, portions similar to those in FIGS. 3A to 5 are given the same reference numerals.

The defocus amount d is defined such that, assuming that the distance from a subject image forming position to the imaging plane 500 is a value |d|, a front-focused state in which the subject image forming position is located further on the subject side than the imaging plane is negative (d<0), and a rear-focused state in which the subject image forming position is located further on the side opposite to the subject side than the imaging plane 500 is positive (d>0). In a focus state in which the subject image forming position is on the imaging plane 500 (in-focus position), d=0. In FIG. 6, a subject 601 is an example of the focus state (d=0), and a subject 602 is an example of the front-focused state (d<0). The front-focused state (d<0) and the rear-focused state (d>0) will be collectively referred to as a defocused state (|d|>0).

In the front-focused state (d<0), a subject light beam that has passed through the first partial pupil region 401 among light beams from the subject 602 is once condensed, thereafter expands to a width Γ1 with a center of gravity position G1 of the light beam at the center, and becomes a blurred image on the imaging plane 500. The same applies to a subject light beam that has passed through the second partial pupil region 402, and this subject light beam forms a blurred image expanding to a width Γ2 with a center of gravity position G2 thereof at the center. The blurred images are received by the first focus detection pixels 201 and the second focus detection pixels 202 that constitute respective pixels arranged in the image sensor 106, and the first focus detection signal and the second focus detection signal are generated respectively therefrom. Accordingly, the first focus detection signal and the second focus detection signal are recorded as subject images in which the subject 602 blurs so as to have the widths Γ1 and Γ2, respectively, at the center of gravity positions G1 and G2 on the imaging plane 500. The blur widths Γ1 and Γ2 of the subject images increase roughly in proportion to an increase of the value |d| of the defocus amount d. Similarly, the value |p| of the image shift amount p (=difference G1-G2 between center of gravity positions of light beams) of the subject images between the first focus detection signal and the second focus detection signal also increases roughly in proportion to an increase of the value |d| of the defocus amount d. The same applies to the rear-focused state (d>0), whereas the direction of the image shift in the subject images between the first focus detection signal and the second focus detection signal is opposite to that in the front-focused state.

In this manner, the value of the image shift amount between the first focus detection signal and the second focus detection signal increases with an increase of the value of the defocus amounts of the first focus detection signal and the second focus detection signal, or the value of the defocus amount of the imaging signal obtained by adding the first focus detection signal and the second focus detection signal.

[Focus Detection]

Next, in this embodiment, first focus detection by a phase difference method and second focus detection by a method based on the principle of refocusing (hereinafter referred to as a "refocusing method") are performed, using a correlation between the above-described defocus amount and image shift amount of the first focus detection signal and the second focus detection signal. The first focus detection is performed when the focus state of a subject is in a range from a large defocused state to a small defocused state, and the second focus detection is performed when the focus state of the subject is in a range from the small defocused state to the vicinity of a best in-focus position. In this embodiment, the focus state of a subject is determined by comparison between a predetermined value and a detected defocus amount.

[First Focus Detection by Phase Difference Method]

First, the first focus detection by the phase difference method in this embodiment will be described. In the first focus detection by the phase difference method, the first focus detection signal and the second focus detection signal are relatively shifted, the amount of correlation (first evaluation value) that indicates the degree of coincidence of the signals is calculated, and the image shift amount is detected from a shift amount with which the correlation (degree of coincidence of signals) improves. Based on the correlation in which the value of the image shift amount between the first focus detection signal and the second focus detection signal increases with an increase of the value of the defocus amount of the imaging signal, the image shift amount is converted into a first detected defocus amount, as described later, to perform focus detection.

Figure 7:
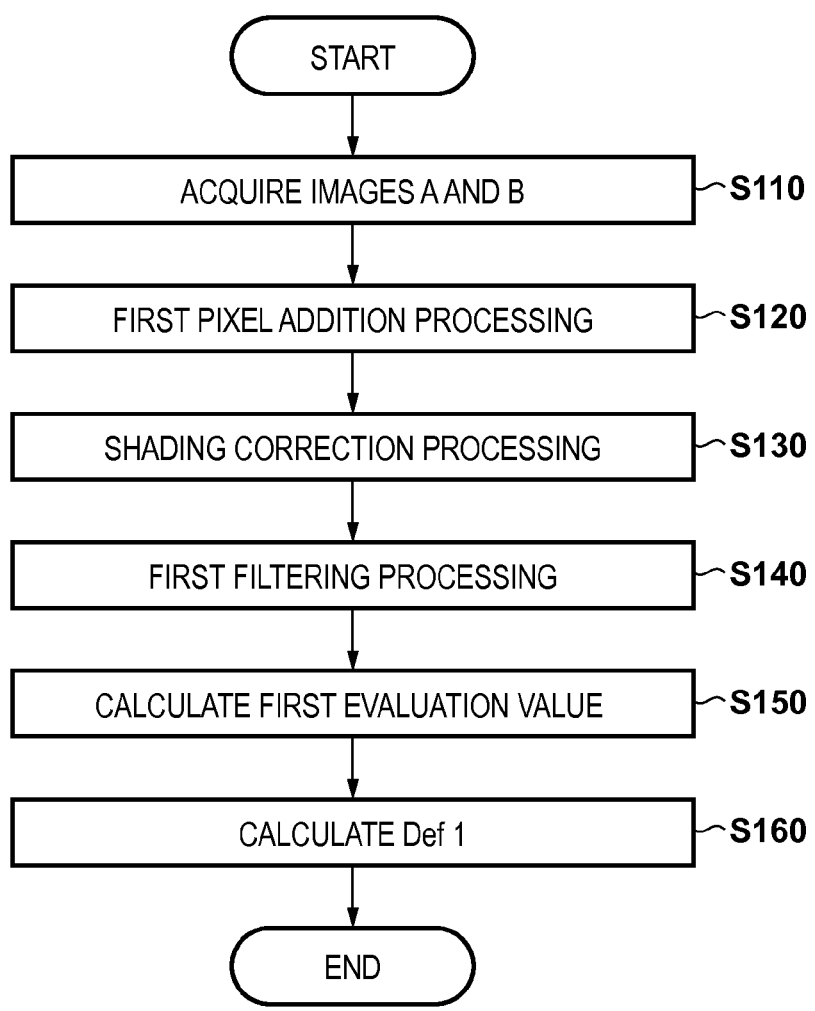
FIG. 7 is a flowchart showing first focus detection processing according to the embodiment.

FIG. 7 is a flowchart of a first focus detection operation in the first embodiment. Note that the operation in FIG. 7 is executed by the image sensor 106, the camera signal processing unit 107, and the camera microcomputer 114 that controls them.

In step S110, initially, the camera microcomputer 114 sets a focus detection region for which focus control is performed, in an effective pixel region of the image sensor 106. Subsequently, the camera microcomputer 114 controls the image sensor 106 to generate the first focus detection signal (image A) from the light signal of the first focus detection pixels 201 within the focus detection region, and also generate the second focus detection signal (image B) from the light signal of the second focus detection pixels 202 within the focus detection region.

In step S120, the camera signal processing unit 107 performs three-pixel addition processing in a column direction on the first focus detection signal and the second focus detection signal in order to suppress the amount of signal data, and further performs Bayer (RGB) addition processing in order to convert RGB signals into luminance Y signals. A combination of these two types of addition processing will be referred to as first pixel addition processing.

In step S130, the camera signal processing unit 107 further performs shading correction processing (optical correction processing) on the first focus detection signal and the second focus detection signal that have been subjected to the first pixel addition processing. In the first focus detection by the phase difference method, the first detected defocus amount is detected based on a correlation (degree of coincidence of signals) between the first focus detection signal and the second focus detection signal. If shading occurs due to a shift of a pupil, the correlation (degree of coincidence of signals) between the first focus detection signal and the second focus detection signal decreases in some cases. Accordingly, in the first focus detection by the phase difference method, it is desirable to perform the shading correction processing (optical correction processing) in order to improve the correlation (degree of coincidence of signals) between the first focus detection signal and the second focus detection signal and to obtain good focus detection performance. The shading occurring due to a shift of a pupil between the first focus detection signal and the second focus detection signal will now be described.

FIGS. 8A to 8C show relationships between the first partial pupil region 401 of the first focus detection pixel 201, the second partial pupil region 402 of the second focus detection pixel 202, and the exit pupil 410 of the imaging optical system, at a peripheral image height of the image sensor 106. Note that portions similar to those in FIG. 4 are given the same reference numerals.

FIG. 8A shows the case where the exit pupil distance D1 of the imaging optical system and the set pupil distance Ds of the image sensor 106 are the same, and the first partial pupil region 401 and the second partial pupil region 402 are in a state of roughly equally dividing the exit pupil 410 of the imaging optical system.

In contrast, in the case where the exit pupil distance D1 of the imaging optical system is shorter than the set pupil distance Ds of the image sensor 106 as shown in FIG. 8B, a shift occurs between the exit pupil of the imaging optical system and the entrance pupil of the image sensor 106 at the peripheral image height of the image sensor 106. For this reason, the exit pupil 410 of the imaging optical system is unequally divided. Similarly, in the case where the exit pupil distance D1 of the imaging optical system is longer than the set pupil distance Ds of the image sensor 106 as shown in FIG. 8C, a shift also occurs between the exit pupil of the imaging optical system and the entrance pupil of the image sensor 106 at the peripheral image height of the image sensor 106. Therefore, the exit pupil 410 of the imaging optical system is unequally divided. As the pupil division becomes unequal at the peripheral image height, the intensities of the first focus detection signal and the second focus detection signal also becomes unequal, and shading occurs, i.e., the intensity of either one of the first focus detection signal and the second focus detection signal becomes larger and the intensity of the other one becomes smaller.

For this reason, in step S130, the camera signal processing unit 107 performs the shading correction processing (optical correction processing). Initially, a first shading correction coefficient for the first focus detection signal and a second shading correction coefficient for the second focus detection signal are generated in accordance with the image height in the focus detection region, the F-number of an imaging lens (imaging optical system), and the exit pupil distance. Subsequently, the first focus detection signal is multiplied by the first shading correction coefficient, the second focus detection signal is multiplied by the second shading correction coefficient, and the shading correction processing (optical correction processing) for the first focus detection signal and the second focus detection signal ends. In the first focus detection by the phase difference method, the first detected defocus amount is detected based on the correlation (degree of coincidence of signals) between the first focus detection signal and the second focus detection signal, and if shading occurs due to a shift of a pupil, there are cases where the correlation between the first focus detection signal and the second focus detection signal decreases. Accordingly, in the first focus detection by the phase difference method, it is desirable to perform the shading correction processing in order to improve the correlation between the first focus detection signal and the second focus detection signal and to obtain good focus detection performance.

Figure 9:
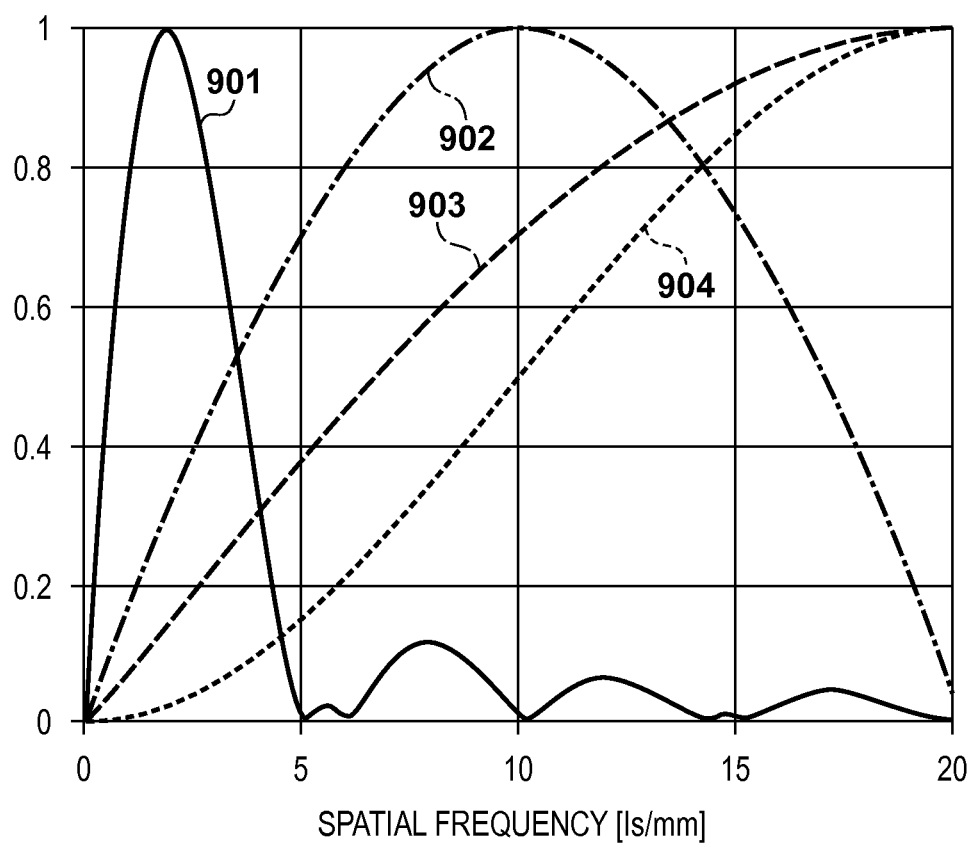
FIG. 9 is a diagram showing exemplary frequency bands of filtering processing according to the embodiment.

In step S140, first filtering processing is performed on the first focus detection signal and the second focus detection signal that have been subjected to the shading correction processing. An exemplary passband in the first filtering processing in the first embodiment is denoted by solid line 901 in FIG. 9. In the first embodiment, since focus detection is performed in a large defocused state by means of the first focus detection by the phase difference method, the passband in the first filtering processing is configured to include a low frequency band. When performing focus control in the range from the large defocused state to the small defocused state, the passband in the first filtering processing at the time of the first focus detection may be adjusted, as necessary, to a higher frequency band as denoted by a dot-dash line 902 in FIG. 9, in accordance with the defocused state.

Next, in step S150, first shift processing is performed for relatively shifting, in the pupil division direction, the first focus detection signal and the second focus detection signal after the first filtering processing, and the amount of correlation (first evaluation value) indicating the degree of coincidence of the signals is calculated. Let a $k^{th}$ first focus detection signal after the first filtering processing be A(k), a $k^{th}$ second focus detection signal be B(k), the range of the number k corresponding to the focus detection region be W, the shift amount in the first shift processing be $s_1$ and the shift range of the shift amount $s_1$ be Γ1, then the amount of correlation (first evaluation value) COR is calculated by Expression (1).

$$COR(s_1) = \sum_{k \in W} |A(k) - B(k - s_1)|, \, s_1 \in \Gamma 1 \quad (1)$$

In the first shift processing with the shift amount $s_1$, the $k^{th}$ first focus detection signal A(k) corresponding to the $k^{th}$ pixel is associated with a $k-s_1^{th}$ second focus detection signal B(k−$s_1$), and then the $k-s_1^{th}$ second focus detection signal B(k−$s_1$) is subtracted from the $k^{th}$ first focus detection signal A(k) to generate a shift subtraction signal. The absolute value of the generated shift subtraction signal is calculated, the sum of the calculated absolute values with respect to the number k within the range W corresponding to the focus detection region is obtained, and the amount of correlation (first evaluation value) COR ($s_1$) is calculated. The amounts of correlation (first evaluation values) calculated for respective rows may be added over multiple rows with each shift amount, as necessary.

In step S160, a shift amount of a real number value with which the amount of correlation takes the smallest value is calculated using sub-pixel calculation from the amount of correlation (first evaluation value), and is set as an image shift amount p1. Then, the calculated image shift amount p1 is multiplied by the image height of the focus detection region, the F-number of the imaging lens (imaging optical system), and a first conversion coefficient K1 corresponding to the exit pupil distance, and the first detected defocus amount (Def1) is detected.

As described above, in this embodiment, with the first focus detection by the phase difference method, the first filtering processing and the first shift processing are performed on the first focus detection signal and the second focus detection signal to calculate the amount of correlation, and the first detected defocus amount is detected from the amount of correlation.

In the image sensor 106 in this embodiment, the light beam received by each focus detection pixel (first focus detection pixel and second focus detection pixel) is different from the light beam received by the imaging pixel. For this reason, the influence of aberrations (spherical aberration, astigmatism, coma aberration, etc.) of the imaging optical system on the focus detection pixel is different from the influence thereof on the imaging signal. In a region where the image height is particularly high, the difference is larger as the f-number of the imaging optical system is smaller (brighter). For this reason, when the f-number of the imaging optical system is small (bright), there are cases where a difference occurs between the detected in-focus position calculated by means of the first focus detection by the phase difference method and the best in-focus position of the imaging signal. In particular, in the case where the f-number of the imaging optical system is smaller than or equal to a predetermined f-number, the focus detection accuracy of the first focus detection by the phase difference method lowers in some cases. Note that, here, the detected in-focus position is a position at which the first detected defocus amount is 0, and the best in-focus position of the imaging signal is an MTF (Modulation Transfer Function) peak position of the imaging signal.

Figure 10:
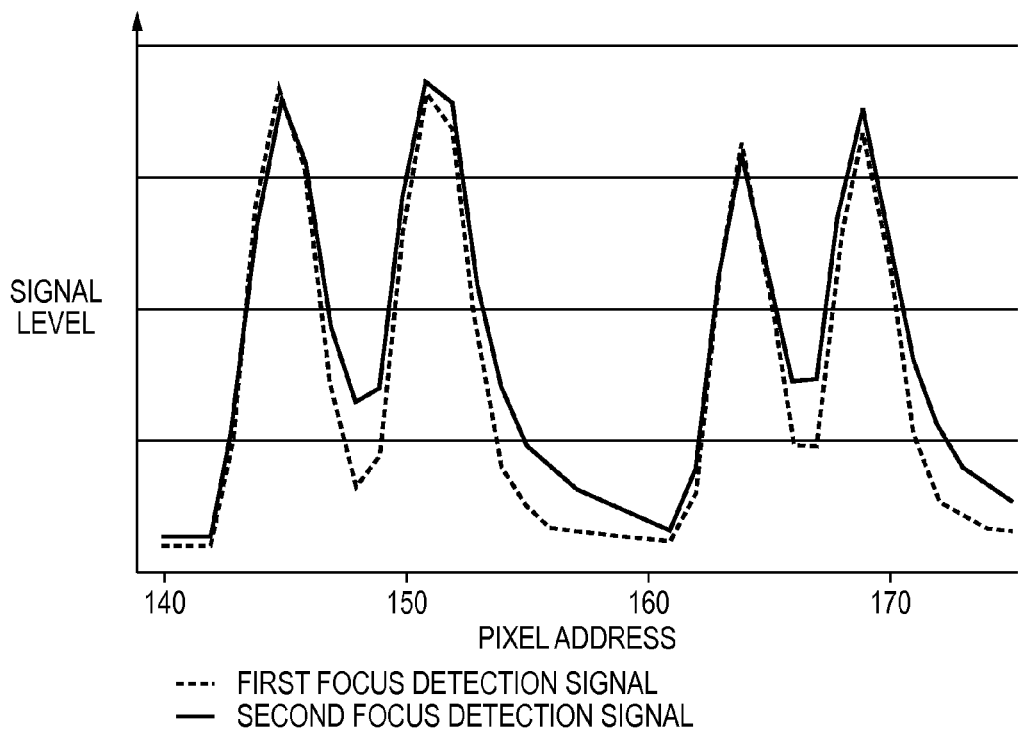
FIG. 10 is a diagram showing an example of the first focus detection signal and the second focus detection signal in the case where a focus lens is at a best in-focus position, according to a first embodiment.
Figure 11:
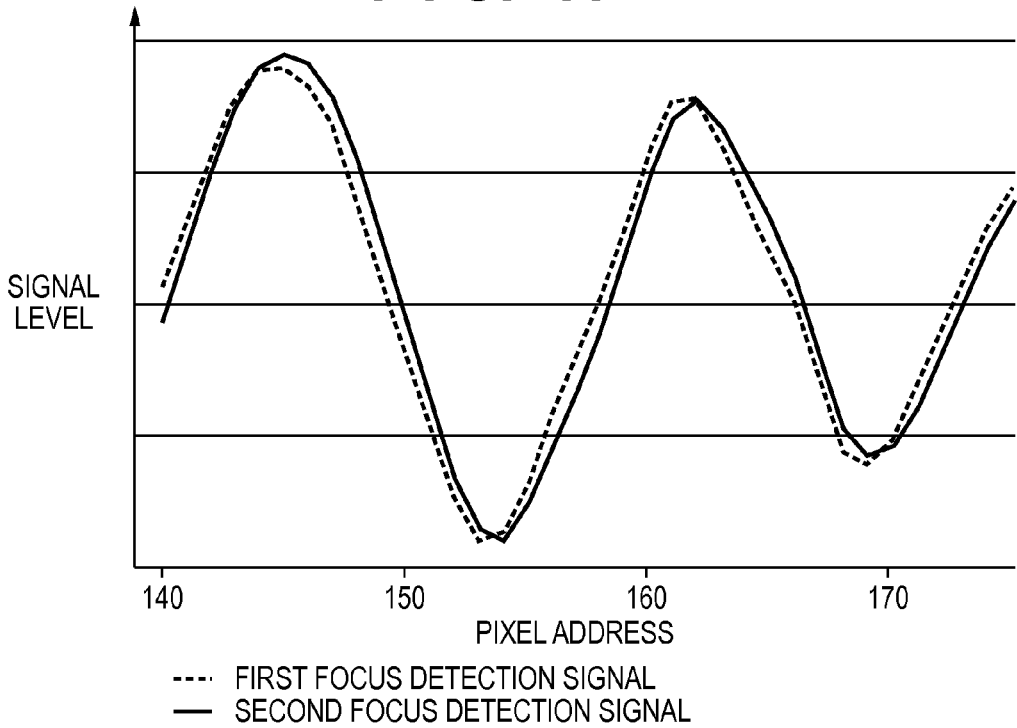
FIG. 11 is a diagram showing an example of the first focus detection signal and the second focus detection signal that have undergone first filtering processing in the case where the focus lens is at the best in-focus position.

FIG. 10 shows an example of the first focus detection signal (broken line) and the second focus detection signal (solid line) at the peripheral image height of the image sensor 106 in this embodiment, in the case where the focus lens 105 is at the best in-focus position of the imaging signal. Although at the best in-focus position of the imaging signal, the signal shapes of the first focus detection signal and the second focus detection signal are different from each other, due to the influence of the aberrations of the imaging optical system. FIG. 11 shows the first focus detection signal (broken line) and the second focus detection signal (solid line) after the shading correction processing and the first filtering processing. Although the focus lens 105 is at the best in-focus position of the imaging signal, the image shift amount p1 between the first focus detection signal and the second focus detection signal is not 0. Accordingly, a difference occurs between the detected in-focus position calculated by means of the first focus detection by the phase difference method and the best in-focus position of the imaging signal.

Figure 12:
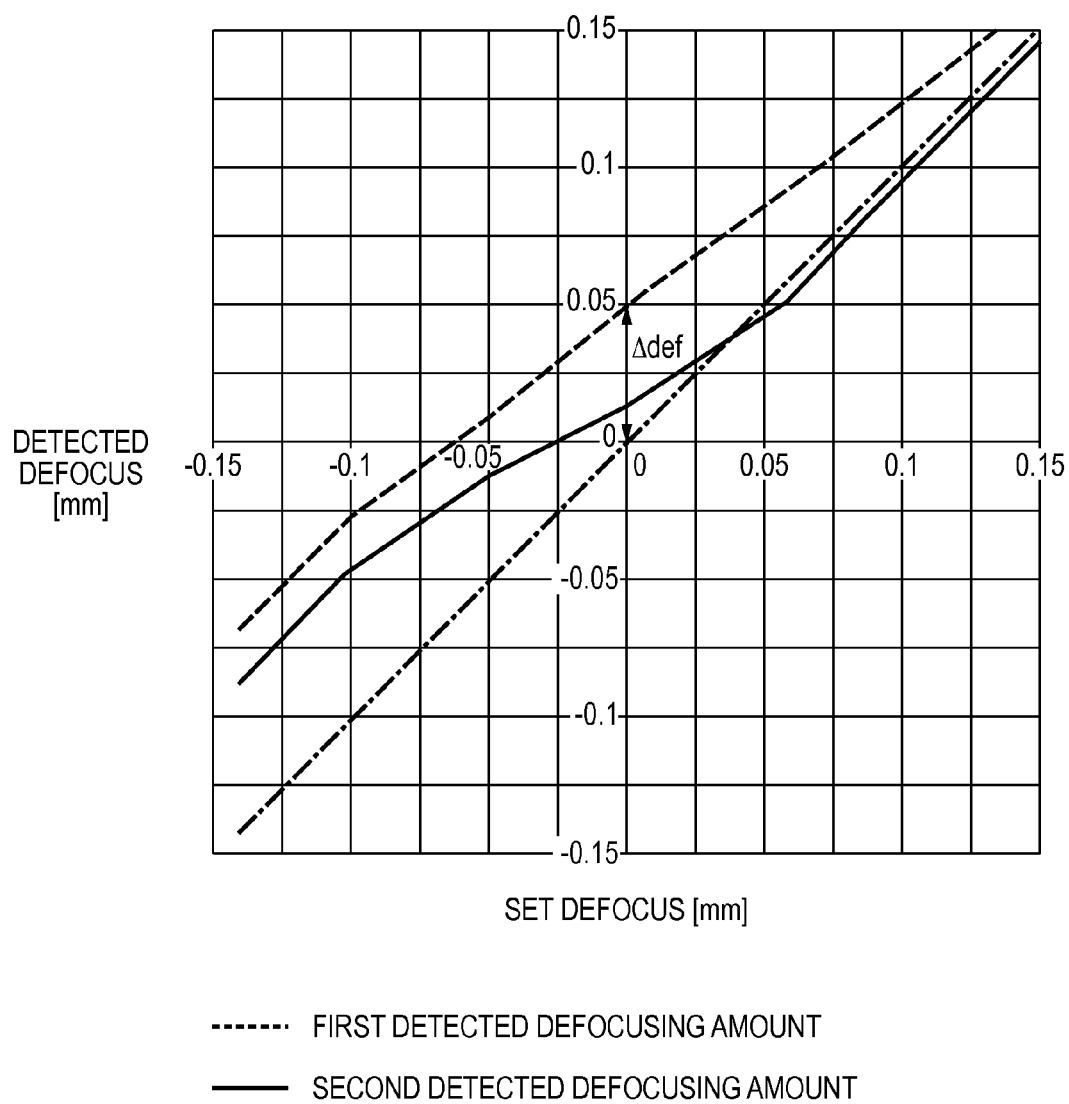
FIG. 12 is a diagram showing an example of a first detected defocus amount and a second detected defocus amount according to the first embodiment.

FIG. 12 shows an example of the first detected defocus amount (broken line) obtained by means of the first focus detection by the phase difference method in this embodiment. The horizontal axis indicates the set defocus amount, with the best in-focus position being the defocus amount of 0 [mm]. The vertical axis indicates the detected defocus amount obtained by means of the first focus detection by means of the phase difference method. Note that the first focus detection signal and the second focus detection signal shown in FIG. 10 are the first focus detection signal and the second focus detection signal with the set defocus amount of 0 [mm] in FIG. 12. In the example shown in FIG. 12, at the best in-focus position with the set defocus amount of 0, the first detected defocus amount (Def1) obtained by means of the first focus detection is offset by about 50 μm on the rear focus side. It can be found therefrom that a difference (Δdef) by about 50 μm has occurred between the best in-focus position and the detected in-focus position calculated by means of the first focus detection.

In this embodiment, in order to suppress the difference between the detected in-focus position calculated from the focus detection signals and the best in-focus position of the imaging signal, the second focus detection by the refocusing method is performed with which accurate focus detection can be performed near the best in-focus position of the imaging optical system, in addition to the first focus detection by the phase difference method. It is thereby possible to perform accurate focus detection.

[Second Focus Detection by Refocusing Method]

Next, the second focus detection by the refocusing method in this embodiment will be described. In the second focus detection by the refocusing method in this embodiment, initially, the first focus detection signal and the second focus detection signal are relatively shifted and added to generate a shift addition signal (refocusing signal). Subsequently, an evaluation value (hereinafter, a contrast evaluation value) based on the contrast of the generated shift addition signal (refocusing signal) is calculated, an MTF peak position of the imaging signal is estimated from the contrast evaluation value, and a second detected defocus amount is detected.

Figure 13:
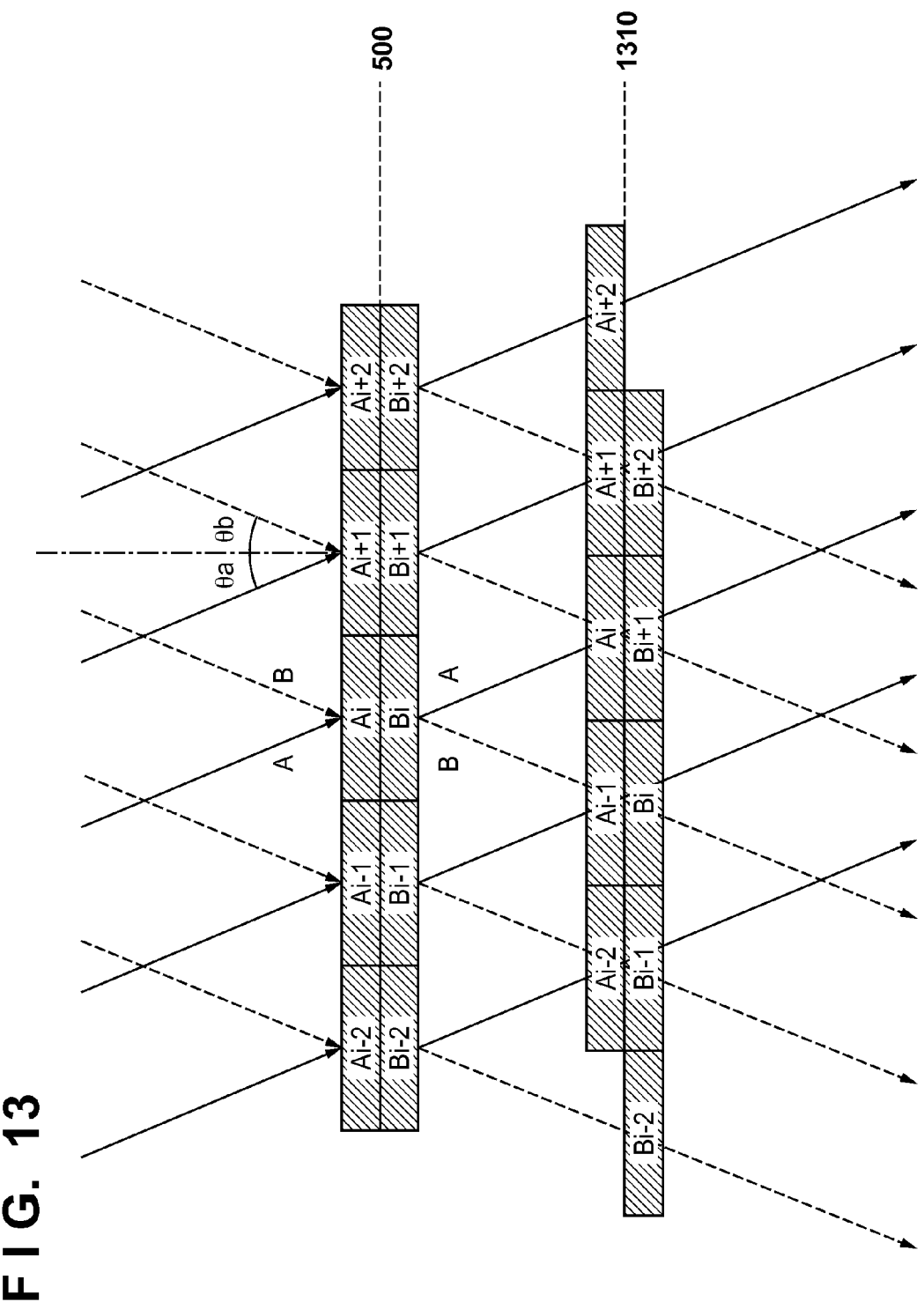
FIG. 13 is a schematic explanatory view of refocusing processing according to the embodiment.

FIG. 13 is a diagram for illustrating the refocusing processing in a one-dimensional direction (row direction, horizontal direction) using the first focus detection signal and the second focus detection signal that are acquired by the image sensor 106 in this embodiment. In FIG. 13, portions similar to those in FIGS. 5 and 6 are given the same reference numerals. FIG. 13 schematically shows the first focus detection signal of an $i^{th}$ pixel in the row direction in the image sensor 106 arranged on the imaging plane 500 as Ai, and the second focus detection signal thereof as Bi, where i is an integer. The first focus detection signal Ai indicates a light signal of a light beam that enters the $i^{th}$ pixel at a principal light beam angle θa (corresponding to the first partial pupil region 401 in FIG. 5). Similarly, the second focus detection signal Bi indicates a light signal of a light beam that enters the $i^{th}$ pixel at a principal light beam angle θb (corresponding to the second partial pupil region 402 in FIG. 5).

The first focus detection signal Ai and the second focus detection signal Bi have incident angle information as well as light intensity distribution information. Accordingly, a refocusing signal on a virtual image forming plane 1310 can be generated by moving the first focus detection signal Ai in a parallel direction along the angle θa up to the virtual image forming plane 1310, moving the second focus detection signal Bi in a parallel direction along the angle θb up to the virtual image forming plane 1310, and adding the moved first and second focus detection signals. Moving the first focus detection signal Ai in a parallel direction along the angle θa up to the virtual image forming plane 1310 corresponds to a shift by +0.5 pixel in the row direction. Moving the second focus detection signal Bi in a parallel direction along the angle θb up to the virtual image forming plane 1310 corresponds to a shift by −0.5 pixel in the row direction. Accordingly, the refocusing signal on the virtual image forming plane 1310 can be generated by relatively shifting the first focus detection signal Ai and the second focus detection signal Bi by +1 pixel so as to associate Ai with Bi+1, and adding the shifted first and second focus detection signals. Similarly, by shifting the first focus detection signal Ai and the second focus detection signal Bi by an integer number of pixels and adding the shifted first and second focus detection signals, the shift addition signal (refocusing signal) on each virtual image forming plane corresponding to the integer shift amount can be generated.

The second focus detection by the refocusing method is performed by calculating the contrast evaluation value of the generated shift addition signal (refocusing signal) and estimating the MTF peak position of the imaging signal from the calculated contrast evaluation value.

Figure 14:
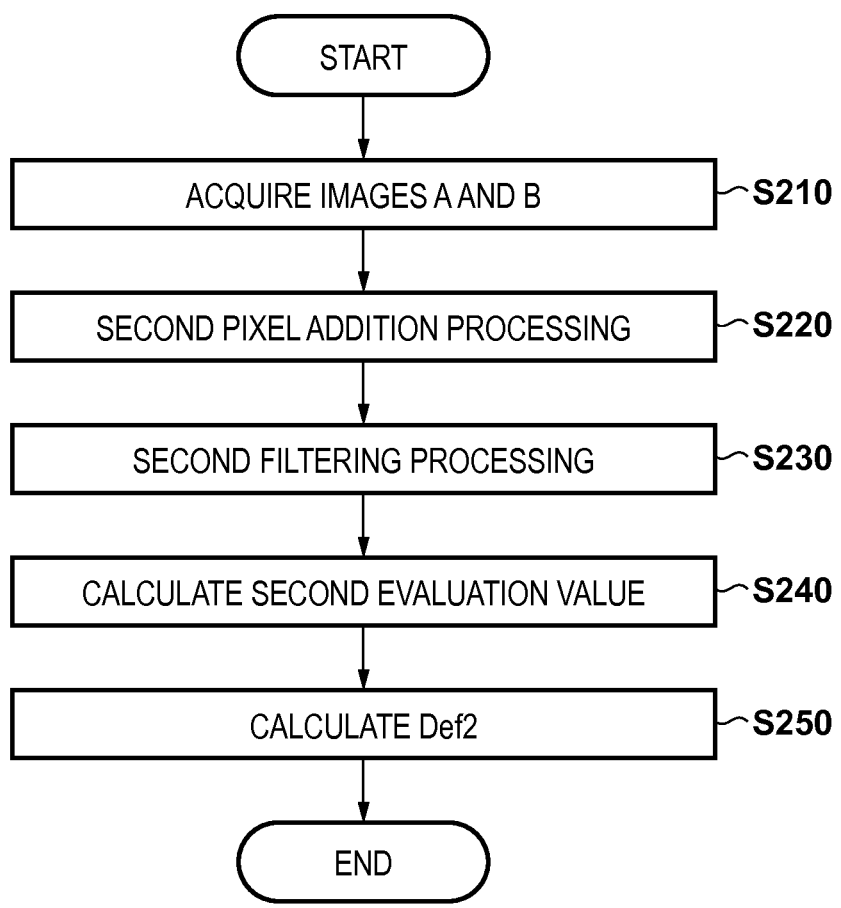
FIG. 14 is a flowchart showing second focus detection processing according to the embodiment.

FIG. 14 is a flowchart of the second focus detection in the first embodiment. Note that the operation in FIG. 14 is also executed by the image sensor 106, the camera signal processing unit 107, and the camera microcomputer 114 that controls them.

In step S210, initially, the camera microcomputer 114 sets a focus detection region for which focus control is performed, in an effective pixel region of the image sensor 106. Subsequently, the driving of the image sensor 106 is controlled to acquire the first focus detection signal (image A) from the light signals of the first focus detection pixels 201 within the focus detection region, and also acquire the second focus detection signal (image B) from the light signals of the second focus detection pixels 202 within the focus detection region.

In step S220, three-pixel addition processing is performed in the column direction on the first focus detection signal and the second focus detection signal in order to suppress the amount of signal data, and Bayer (RGB) addition processing is further performed in order to convert RGB signals into luminance Y signals. A combination of these two types of addition processing will be referred to as second pixel addition processing. Either or both the three-pixel addition processing and the Bayer (RGB) addition processing may be omitted as necessary. Thereafter, processing for adding horizontal-direction pixels (horizontal pixel addition processing) is performed, on the first focus detection signal and the second focus detection signal, corresponding to pixels of a horizontal pixel addition number K, that have been subjected to the second pixel addition processing. Note that the horizontal pixel addition number K used here is set in the processing in step S1913 in the flowchart in FIG. 19, or in the processing in step S2009 in the flowchart in FIG. 20. The processing in these steps will be described later.

In step S230, second filtering processing is performed on the first focus detection signal and the second focus detection signal that have been subjected to the second pixel addition processing. An exemplary passband in the second filtering processing in the first embodiment is denoted by broken line 903 in FIG. 9. In this embodiment, focus detection is performed in the range from the small defocused state to the vicinity of the best in-focus position, by means of the second focus detection by the refocusing method. Accordingly, the passband in the second filtering processing is configured to include a higher frequency band than the passband in the first filtering processing. The passband in the second filtering processing may be a higher frequency band as denoted by dotted line 904 in FIG. 9, using a Laplacian (second-order differentiation type) [1, −2, 1] filter for performing edge extraction on a subject signal in the second filtering processing, as necessary. By extracting high-frequency components of the subject and performing the second focus detection, the focus detection accuracy can be further improved.

In step S240, second shift processing is performed for relatively shifting the first focus detection signal and the second focus detection signal undergone the second filtering processing in the pupil division direction, and the shifted first and second focus detection signals are added to generate a shift addition signal (refocusing signal). In step S240, furthermore, a contrast evaluation value (second evaluation value) is calculated from the generated shift addition signal.

Assume that a first focus detection signal corresponding to the $k^{th}$ pixel after the second filtering processing is A(k), a second focus detection signal corresponding to the $k^{th}$ pixel is B(k), and the range of the number k corresponding to the focus detection region is W. Assuming that the shift amount in the second shift processing is $s_2$ and the shift range of the shift amount $s_2$ is Γ2, the contrast evaluation value (second evaluation value) RFCON is calculated by Expression (2).

$$RECON(s_2) = \max_{k \in W} |A(k) + B(k - s_2)|, s_2 \in \Gamma 2 \qquad (2)$$

In the second shift processing with the shift amount $s_2$, the first focus detection signal A(k) corresponding to the $k^{th}$ pixel is associated with a second focus detection signal $B(k-s_2)$ corresponding to the $k-s_2^{th}$ pixel, and then the $k^{th}$ first focus detection signal A(k) corresponding to the $k^{th}$ pixel and the second focus detection signal $B(k-s_2)$ corresponding to the $k-s_2^{th}$ pixel are added to generate a shift addition signal, and the absolute value of the shift addition signal is calculated. Thereafter, the largest value of the absolute values of the shift detection signals in the range of the focus detection region W is obtained, and the contrast evaluation values (second evaluation value) RFCON ($s_2$) is calculated. The contrast evaluation values (second evaluation values) calculated for respective rows may be added over multiple rows with each shift amount, as necessary.

In step S250, a shift amount of a real number value with which the contrast evaluation value takes the largest value is calculated using sub-pixel calculation from the contrast evaluation value (second evaluation value), and is set as a peak shift amount p2. The peak shift amount p2 is multiplied by the image height of the focus detection region, the F-number of the imaging lens (imaging optical system), and a second conversion coefficient K2 corresponding to the exit pupil distance, and the second detected defocus amount (Def2) is detected. Note that the first conversion coefficient K1 and the second conversion coefficient K2 may be the same value, as necessary.

In this manner, in the present invention, the second filtering processing and the second shift processing are performed on the first focus detection signal and the second focus detection signal by means of the second focus detection by the refocusing method, and thereafter addition is performed to generate the shift addition signal. Furthermore, the contrast evaluation value is calculated from the shift addition signal, and the second detected defocus amount (Def2) is detected from the contrast evaluation value.

With the image sensor 106 in this embodiment, as shown in FIGS. 4 and 5, a result of addition of the light beam received by the first focus detection pixel and the light beam received by the second focus detection pixel is the light beam received by the imaging pixel. In the second focus detection by the refocusing method, focus detection is performed using the shift addition signal (refocusing signal) of the first focus detection signal and the second focus detection signal, unlike in the first focus detection by the phase difference method. Accordingly, since the light beam corresponding to the shift addition signal used in the second focus detection roughly coincides with the light beam corresponding to imaging signal, the influence of aberrations (spherical aberration, astigmatism, coma aberration, etc.) of the imaging optical system on the shift addition signal is also roughly the same as the influence thereof on the imaging signal. Accordingly, the detected in-focus position (position where the second detected defocus amount (Def1) is 0) calculated by means of the second focus detection by the refocusing method roughly coincides with the best in-focus position (MTF peak position) of the imaging signal, and therefore focus detection can be more accurately performed than by means of the first focus detection by the phase difference method.

Figure 15:
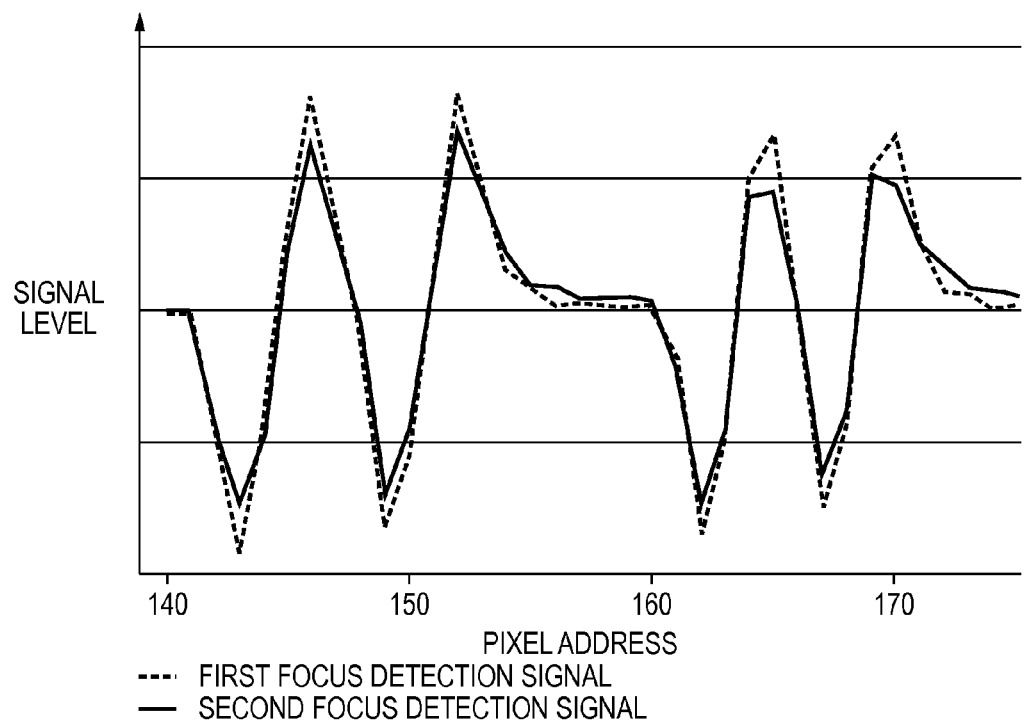
FIG. 15 is a diagram showing an example of the first focus detection signal and the second focus detection signal that have undergone second filtering processing in the case where the focus lens is at the best in-focus position.
Figure 16:
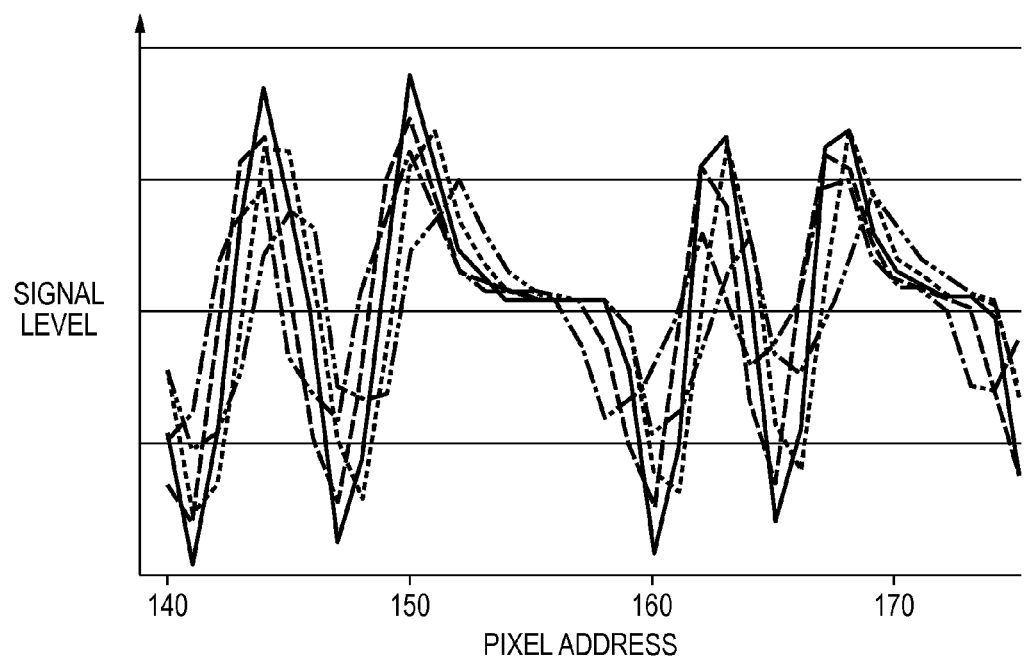
FIG. 16 is a diagram showing an example of shift addition signals of the first focus detection signal and the second focus detection signal that have undergone the second filtering processing according to the embodiment.
Figure 17:
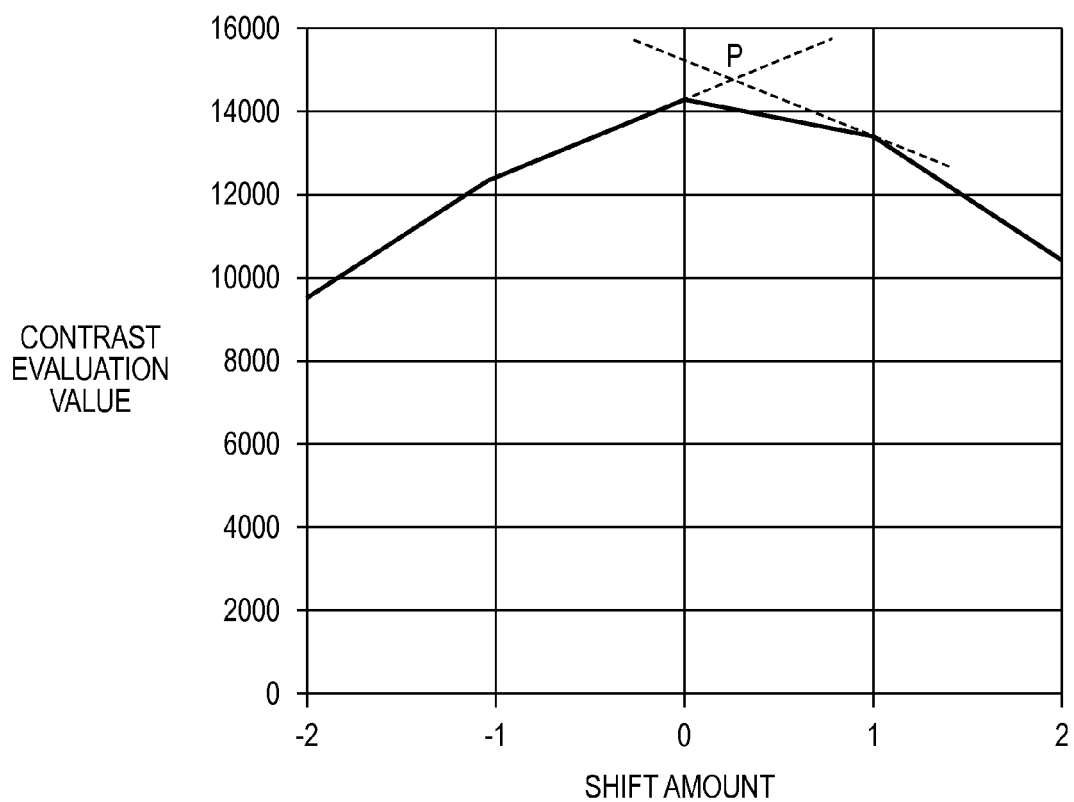
FIG. 17 is a diagram showing an example of contrast evaluation values according to the embodiment.

FIG. 15 shows the first focus detection signal (broken line) and the second focus detection signal (solid line) obtained by performing the second filtering processing on the first focus detection signal (broken line) and the second focus detection signal (solid line) at the best in-focus position of the imaging signal at the peripheral image height of the image sensor 106 shown in FIG. 10 in this embodiment. FIG. 16 shows an example of shift addition signals (refocusing signals) obtained by relatively shifting the first focus detection signal (broken line) and the second focus detection signal (solid line), that have undergone the second filtering processing by −2, −1, 0, 1, and 2, and adding them. It can be found that the peak value of each shift addition signal changes with a change of the shift amount. FIG. 17 shows an example of the contrast evaluation values (second evaluation values) calculated from the respective shift addition signals.

FIG. 12 shows an example of the second detected defocus amount (solid line) obtained by means of the second focus detection by the refocusing method in this embodiment. The horizontal axis indicates the set defocus amount, with the best in-focus position being the defocus amount of 0 [mm]. The vertical axis indicates the detected defocus amount. The first focus detection signal and the second focus detection signal shown in FIG. 10 are the first focus detection signal and the second focus detection signal at the best in-focus position with the set defocus amount of 0 [mm] in FIG. 12. It can be found that, at the best in-focus position with the set defocus amount of 0 [mm], the second detected defocus amount (Def2) obtained by means of the second focus detection is suppressed so as to be smaller than the first detected defocus amount (Def1) obtained by means of the first focus detection, and focus detection can be accurately performed. Accordingly, in this embodiment, focus detection can be more accurately performed by means of the second focus detection by the refocusing method than by means of the first focus detection by the phase difference method, near the best in-focus position with the set defocus amount of 0 [mm] of the imaging optical system.

[Refocusable Range]

On the other hand, the refocusable range is limited, and therefore the range of the defocus amount with which focus detection can be accurately performed by means of the second focus detection by the refocusing method is limited.

Figure 18:
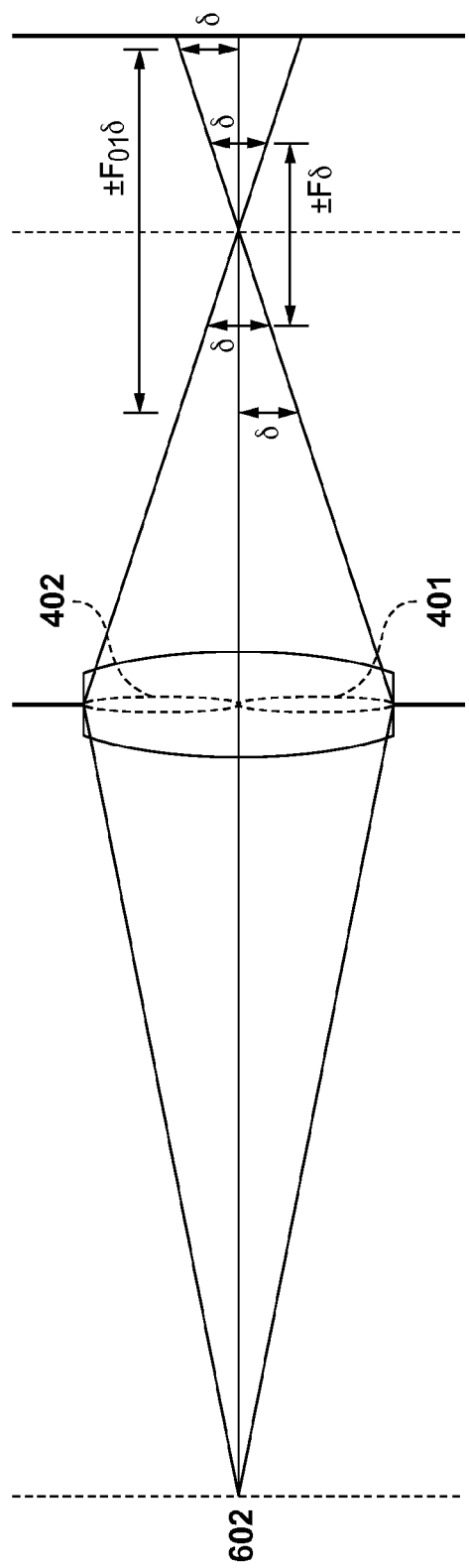
FIG. 18 is a schematic explanatory view of a refocusable range according to the embodiment.

FIG. 18 is a schematic explanatory view of the refocusable range according to this embodiment. In FIG. 18, portions similar to those in FIGS. 5 and 6 are given the same reference numerals. Let an permissible circle of confusion be $\delta$ and the f-number of the imaging optical system be F, then the depth of field with the f-number F is $\pm F\delta$. Meanwhile, the effective f-number $F_{01}$ in the horizontal direction of the partial pupil region 401 that is narrowed as a result of division into NH×NV(2×1) is $F_{01}$=NHF, which is dark. The effective depth of field for each first focus detection signal is $\pm$NHF$\delta$, which is NH times deeper, and the in-focus position expands NH times. Within the range of the effective depth of field of $\pm$NHF$\delta$, an in-focus subject image is acquired from each first focus detection signal (or second focus detection signal). The same applies to the effective f-number $F_{02}$ in the horizontal direction of the partial pupil region 402, which is $F_{02}$=NHF and is dark, and the effective depth of field for each second focus detection signal is $\pm$NHF$\delta$, which is NH times deeper. Within the range of this effective depth of field, an in-focus subject image is acquired from each second focus detection signal. Accordingly, the in-focus position can be readjusted (refocused) after capturing an image, by performing the refocusing processing in which the first focus detection signal (or second focus detection signal) is moved in a parallel direction along the principal light beam with an angle θa (or θb) shown in FIG. 13. Accordingly, the defocus amount d with respect to the imaging plane with which the in-focus position can be readjusted (refocused) after photographing is limited, and the refocusable range of the defocus amount d roughly is a range indicated by Expression (3).

$$|d| \leq NHF\delta \qquad (3)$$

The permissible circle of confusion $\delta$ is defined by $\delta=2\Delta X$ (inverse number of Nyquist frequency $1/(2\Delta X)$ of pixel period $\Delta X$) or the like. The inverse number of the Nyquist frequency $1/(2\Delta X_{AF})$ of the period $\Delta X_{AF}$ (=6$\Delta X$, in the case of six-pixel addition) of the first focus detection signal (second focus detection signal) undergone the second pixel addition processing may be used as the permissible circle of confusion $\delta=2\Delta X_{AF}$, as necessary.

In this manner, the range of the defocus amount within which focus detection can be accurately performed by means of the second focus detection by the refocusing method is roughly limited to the range of Expression (3). That is to say, the defocus range within which focus detection can be accurately performed by means of the second focus detection is a range that is smaller than or equal to the defocus range within which focus detection can be performed by means of the first focus detection by the phase difference method. As shown in FIG. 6, the relative shift amount in the horizontal direction and defocus amount of the first focus detection signal and the second focus detection signal are roughly in proportion to each other. Accordingly, the first embodiment is configured such that the shift range in the second shift processing in the second focus detection by the refocusing method is smaller than or equal to the shift range in the first shift processing in the first focus detection by the phase difference method.

Furthermore, in the focus detection in this embodiment, the first focus detection is performed in order to perform focus control in the range from the large defocused state to the small defocused state of the imaging optical system, and the second focus detection is performed in order to perform focus control in the range from the small defocused state to the vicinity of the best in-focus position of the imaging optical system. Accordingly, it is desirable that the passband in the second filtering processing in the second focus detection includes a higher frequency band than the passband in the first filtering processing in the first focus detection. It is also desirable that the pixel addition number in the second pixel addition processing in the second focus detection is smaller than or equal to the pixel addition number in the first pixel addition processing in the first focus detection.

As described above, in the case where the f-number of the imaging optical system is smaller than or equal to a predetermined f-number, the focus detection accuracy of the first focus detection by the phase difference method lowers in some cases. Accordingly, in the case where the f-number of the imaging optical system is smaller than or equal to the predetermined f-number, it is desirable to detect the second detected defocus amount by means of the second focus detection by the refocusing method, in addition to the first focus detection by the phase difference method, to perform accurate focus detection, as necessary.

In this embodiment, since the pupil region is divided into two regions in the horizontal direction, the horizontal MTF peak position can be detected from the contrast evaluation value of the imaging signal. As necessary, a difference between the horizontal MTF peak position of the imaging signal and the MTF peak position of the imaging signal (average of horizontal and vertical MTF peak positions of imaging signal) may be held as a correction value to correct the second detected defocus amount.

Figure 19:
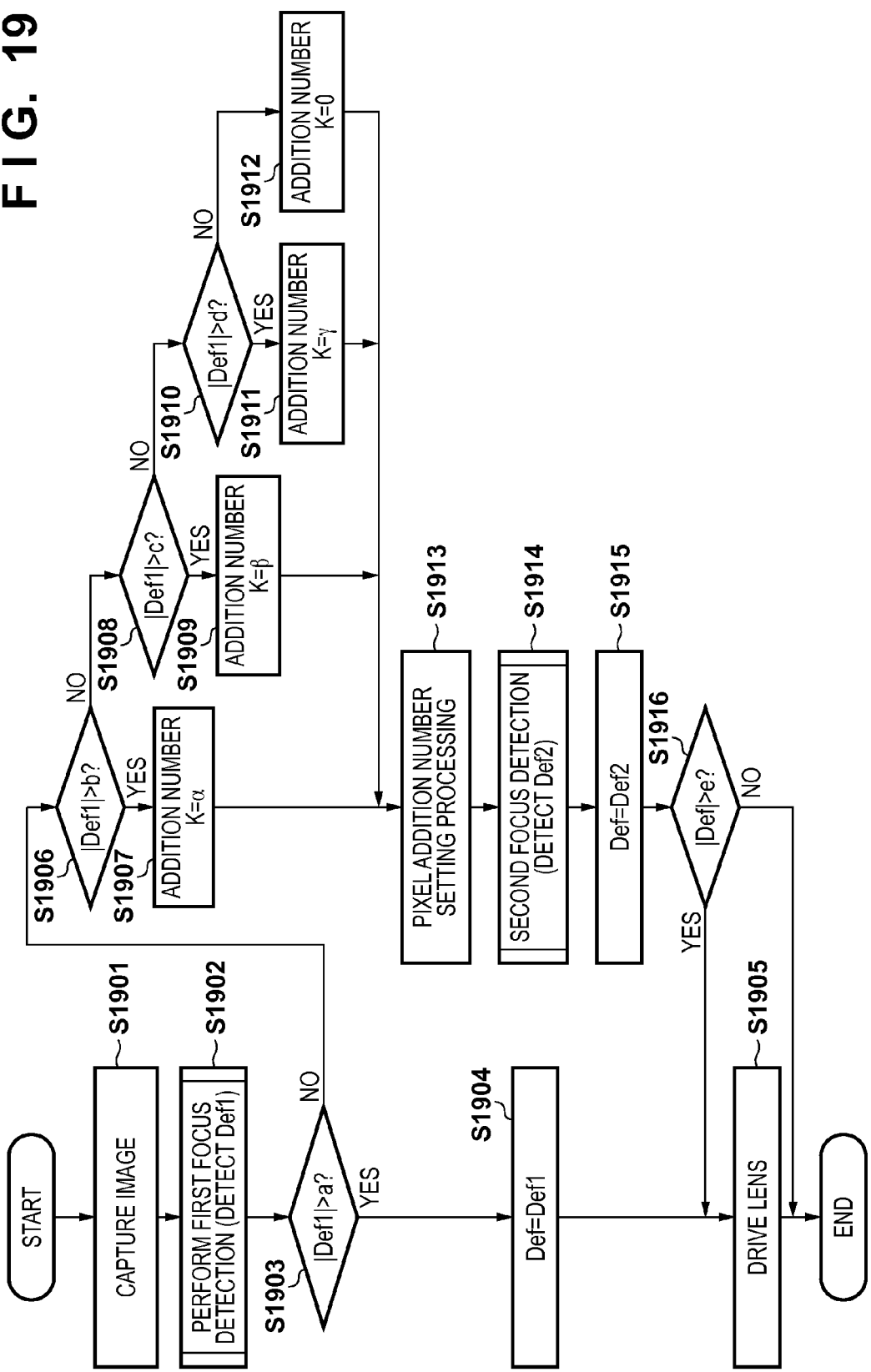
FIG. 19 is a flowchart showing focus detection processing according to the first embodiment.

Next, a focus detection operation according to the first embodiment will be described with reference to a flowchart in FIG. 19. Note that the operation in FIG. 19 is also executed by the image sensor 106, the camera signal processing unit 107, and the camera microcomputer 114 that controls them.

In the first embodiment, the first focus detection by the phase difference method is performed to drive the lenses until the absolute value of the defocus amount of the imaging optical system becomes smaller than or equal to a first predetermined value, and thus focus control is performed in the range from the large defocused state to the small defocused state of the imaging optical system. Thereafter, the second focus detection by the refocusing method is performed to drive the lenses until the absolute value of the defocus amount of the imaging optical system becomes smaller than or equal to a second predetermined value (<first predetermined value), and thus focus control is performed in the range from the small defocused state to the vicinity of the best in-focus position of the imaging optical system.

Initially, in step S1901, an image is captured by the image sensor 106. Next, the processing proceeds to step S1902, and the camera signal processing unit 107 detects, using the image captured in step S1901, the first detected defocus amount (Def1) by means of the first focus detection by the phase difference method. This detection operation is performed by the camera signal processing unit 107 operating in accordance with the flowchart shown in FIG. 7.

In step S1903, the camera microcomputer 114 determines whether or not the value of the first defocus amount (Def1) is larger than a predetermined value a. If the value |Def1| of the detected first defocus amount (Def1) is larger than the predetermined value a (predetermined threshold value), in step S1904 the first defocus amount (Def1) is set as the defocus amount Def. On the other hand, if it is determined in step S1903 that |Def1| is smaller than or equal to the predetermined value a, the processing proceeds to step S1906.

In step S1906, it is determined whether the value |Def1| of the detected first defocus amount (Def1) is larger than a predetermined value b. If larger, the processing proceeds to step S1907, an addition number α is set as the horizontal pixel addition number K, and the processing proceeds to step S1913. If it is determined in step S1906 that |Def1| is smaller than or equal to the predetermined value b, the processing proceeds to step S1908.

In step S1908, it is determined whether the value |Def1| of the detected first defocus amount (Def1) is larger than a predetermined value c. If larger, the processing proceeds to step S1909, an addition number β is set as the horizontal pixel addition number K, and the processing proceeds to step S1913. If it is determined in step S1908 that |Def1| is smaller than or equal to the predetermined value c, the processing proceeds to step S1910.

In step S1910, it is determined whether the value |Def1| of the detected first defocus amount (Def1) is larger than a predetermined value d. If larger, the processing proceeds to step S1911, an addition value γ is set as the horizontal pixel addition number K, and the processing proceeds to step S1913. If it is determined in step S1910 that |Def1| is smaller than or equal to the predetermined value d, the processing proceeds to step S1912, 0 is set as the horizontal pixel addition number K, and the processing proceeds to step S1913.

Note that the relationship regarding largeness and smallness between α, β, and γ to be set as the horizontal pixel addition number K is expressed by Expression (4) below.

$$\alpha > \beta > \gamma > 0 \tag{4}$$

The values of α, β, and γ to be set as the horizontal pixel addition number K are changed in accordance with the aperture of the diaphragm 103. Assuming that the values of α, β, and γ to be set as the horizontal pixel addition number K when the aperture is large are α1, β1, and γ1, and those when the aperture is small are α2, β2, and γ2, respectively, a setting is configured such that Relational expression (5) below holds.

$$\alpha 1 > \alpha 2$$

$$\beta 1 > \beta 2$$

$$\gamma 1 > \gamma 2 \tag{5}$$

In step S1913, the set horizontal pixel addition number K is set as a horizontal pixel addition number to be used in execution of step S220 in the flowchart in FIG. 14, and the processing proceeds to step S1914. In step S1914, the second detected defocus amount (Def2) is detected by means of the second focus detection by the refocusing method. This detection operation is performed by the camera signal processing unit 107 operating using added pixels that are added in step S1912, in accordance with the flowchart shown in FIG. 14. Note that the number of added pixels used in the processing in step S1914 is fixed regardless of the value of the horizontal pixel addition number K.

In step S1915, the second defocus amount (Def2) is set as the defocus amount Def, and the processing proceeds to step S1916. In step S1916, the camera microcomputer 114 determines whether the value of the defocus amount Def2 is larger than a predetermined value e with which it can be assumed that an in-focus state has been achieved. If the value |Def2| of the defocus amount Def is larger than the predetermined value e (<predetermined value a), in step S1905 the focus lens 105 is driven in accordance with the defocus amount Def, and the processing ends. If the value |Def2| of the defocus amount Def detected in step S1916 is smaller than or equal to the predetermined value e, the focus control operation ends without driving the lenses. Note that the relationship regarding largeness and smallness between the predetermined values a, b, c, d, and e follows Expression (6) below.

$$a > b > c > d > e \tag{6}$$

As described above, according to the first embodiment, it is possible to suppress a difference between the detected in-focus position calculated from the focus detection signals and the best in-focus position of the imaging signal, and to perform accurate focus detection. Note that, although each imaging pixel is divided in the horizontal direction in the first embodiment, a similar operation can also be performed in the case of dividing each pixel in the vertical direction.

As described above, the pixel addition number to be used in the second focus detection is changed, depending on the focus state obtained by means of the first focus detection. With this configuration, the in-focus position can be calculated in a wide range by increasing the addition number when in a small blurring state (state where Def1 is large), and the in-focus position can be calculated with highly dense pixels by decreasing the addition number when in the vicinity of the in-focus state (state where Def1 is small), without changing the amount of calculation in the second focus detection.

Second Embodiment

Next, a second embodiment of the present invention will be described. A difference between the second embodiment and the first embodiment lies only in the processing of the camera microcomputer 114, and accordingly the processing executed by the camera microcomputer 114 will be described below.

A focus detection operation according to the second embodiment will be described with reference to a flowchart in FIG. 20. Note that the operation in FIG. 20 is also executed by the image sensor 106, the camera signal processing unit 107, and the camera microcomputer 114 that controls them.

Initially, in step S2001, an image is captured by the image sensor 106. Next, the processing proceeds to step S2002, contrast information (TV-AF signal) of the image captured in step S2001 is extracted using the captured image, and an evaluation value Val is calculated. The evaluation value Val is larger as the contrast is stronger.

In following step S2003, it is determined whether the evaluation value Val is smaller than a predetermined value p (predetermined threshold value). If smaller, the processing proceeds to step S2004, an addition number α' is set as the horizontal pixel addition number K, and the processing proceeds to step S2009. If it is determined in step S2003 that the evaluation value Val is larger than or equal to the predetermined value p, the processing proceeds to step S2005.

In following step S2005, it is determined whether the evaluation value Val is smaller than a predetermined value q. If smaller, the processing proceeds to step S2006, an addition number β' is set as the horizontal pixel addition number K, and the processing proceeds to step S2009. If it is determined in step S2005 that the evaluation value Val is larger than or equal to the predetermined value q, the processing proceeds to step S2007.

In following step S2007, it is determined whether the evaluation value Val is smaller than a predetermined value r. If smaller, the processing proceeds to step S2008, an addition number γγ' is set as the horizontal pixel addition number K, and the processing proceeds to step S2009. If it is determined in step S2007 that the evaluation value Val is larger than or equal to the predetermined value r, the processing proceeds to step S2010, 0 is set as the horizontal pixel addition number K, and thereafter the processing proceeds to step S2009. Note that the relationship regarding largeness and smallness between the predetermined values p, q, and r follows Expression (7) below.

$$p > q > r \quad (7)$$

The relationship regarding largeness and smallness between α', β', and γ' to be set as the horizontal pixel addition number K is expressed by Expression (8) below.

$$\alpha' > \beta' > \gamma' > 0 \quad (8)$$

The values of α', β', and γ' to be set as the horizontal pixel addition number K are changed in accordance with the aperture of the diaphragm 103. Assuming that the values of α', β', and γ' to be set as the horizontal pixel addition number K when the aperture is large are α1', β1', and γ1', and those when the aperture is small are α2', β2', and γ2', respectively, a setting is configured such that Relational expression (9) below holds.

$$\alpha 1' > \alpha 2'$$

$$\beta 1' > \beta 2'$$

$$\gamma 1' > \gamma 2' \quad (9)$$

In step S2009, the set horizontal pixel addition number K is set as a horizontal pixel addition number to be used in execution of step S220 in the flowchart in FIG. 14, and the processing proceeds to step S2011. In step S2011, the second detected defocus amount (Def2) is detected by means of the second focus detection by the refocusing method. This detection operation is performed by the camera signal processing unit 107 operating using the horizontal pixel addition number K that is set in step S2009, in accordance with the flowchart shown in FIG. 14. Note that the number of added pixels used in the processing in step S2011 is fixed regardless of the value of the addition number K.

In step S2012, the second defocus amount Def2 is set as the defocus amount Def, and the processing proceeds to step S2013. In step S2013, the camera microcomputer 114 determines whether the value of the defocus amount Def is larger than a predetermined value s with which it can be assumed that an in-focus state has been achieved. If the value |Def2| of the defocus amount Def is larger than the predetermined value s, in step S2014 the focus lens 105 is driven in accordance with the defocus amount Def2, and the processing ends. If the value |Def2| of the defocus amount Def detected in step S2013 is smaller than or equal to the predetermined value s, the focus control operation ends without driving the focus lens 105.

As described above, according to the second embodiment, it is possible to suppress a difference between the detected in-focus position calculated from the focus detection signals and the best in-focus position of the imaging signal, and accurate focus detection can thereby be performed. Note that, although each imaging pixel is divided in the horizontal direction in the second embodiment, a similar operation can also be performed in the case of dividing each pixel in the vertical direction.

As described above, the pixel addition number to be used in the second focus detection is changed depending on the focus state obtained from the sharpness of the contrast of the captured image. With this configuration, the in-focus position can be calculated in a wide range while increasing the addition number when in a small blurring state (state where the value of Val is small), and the in-focus position can be calculated with highly dense pixels while decreasing the addition number when in the vicinity of the in-focus state (state where value of Val is large), without changing the amount of calculation in the second focus detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-080494, filed on Apr. 9, 2014 which is hereby incorporated by reference herein in its entirety.

What is claimed is:

1. A focus detection apparatus that detects a focus state of a subject using first pixel signals and second pixel signals obtained by performing photoelectric conversion on subject light beams which have passed through different pupil regions of an imaging optical system for forming an optical image of the subject, the focus detection apparatus comprising:
   a first detection unit configured to detect the focus state of the subject from the first pixel signals and second pixel signals;
   an addition unit configured to add each of the first pixel signals and second pixel signals by a predetermined addition number;
   a calculation unit configured to relatively shift the first pixel signals and second pixel signals that have undergone the addition by the addition unit, and calculate an evaluation value based on a contrast of a signal obtained by adding the first pixel signals and the second pixel signals after being shifted; and
   a second detection unit configured to detect a defocus amount from the evaluation value,
   wherein the addition unit sets the predetermined addition number in accordance with the focus state detected by the first detection unit.

2. The focus detection apparatus according to claim 1, wherein the second detection unit detects the defocus amount based on a plurality of evaluation values, the respective evaluation values are generated by adding the first pixel signals and the second pixel signals shifted with respect to each other by different shift amounts.

3. The focus detection apparatus according to claim 1, further comprising a control unit configured to control driving of a focus lens included in the imaging optical system,
   wherein the control unit performs control so as to drive the focus lens based on the defocus amount detected by the second detection unit.

4. The focus detection apparatus according to claim 1, wherein the first detection unit detects a defocus amount based on a phase difference between the first pixel signals and the second pixel signals.

5. The focus detection apparatus according to claim 4, further comprising a control unit configured to control driving of a focus lens included in the imaging optical system,
   wherein, if the defocus amount detected by the first detection unit is larger than a predetermined threshold value, the control unit performs control so as to drive the focus lens based on the defocus amount detected by the first detection unit.

6. The focus detection apparatus according to claim 1, wherein the first pixel signals and second pixel signals are signals output from respective photoelectric conversion portions in pixels each having a plurality of photoelectric conversion portions, and
   the first detection unit detects the focus state based on the contrast of an image signal obtained by adding the first and second pixel signals in each pixel.

7. The focus detection apparatus according to claim 1, wherein, in a case where a degree of focusing based on the focus state detected by the first detection unit is a first state, the addition unit makes the predetermined addition number larger than in a case of a second state in which the degree of focusing is higher than in the first state.

8. The focus detection apparatus according to claim 7, wherein the addition unit does not perform the addition if the degree of focusing based on the focus state detected by the first detection unit exceeds a predetermined threshold value.

9. The focus detection apparatus according to claim 1, wherein, in a case where an aperture of the imaging optical system is larger than a predetermined aperture, the addition unit makes the predetermined addition number larger than in a case where the aperture is smaller than the predetermined aperture.

10. The focus detection apparatus according to claim 1, wherein the calculation unit relatively shifts the first and second pixel signals that have undergone the addition by the addition unit, based on respective incident angles of the subject light beams that have passed through the different pupil regions, and adds the first and second pixel signals.

11. The focus detection apparatus according to claim 1, wherein the calculation unit obtains the evaluation value using a fixed number of the first and second pixel signals that have undergone the addition by the addition unit, regardless of the predetermined addition number.

12. An image capturing apparatus comprising:
   an image sensing unit configured to perform photoelectric conversion on subject light beams that have passed through different pupil regions of an imaging optical system for forming an optical image of the subject, and output a first and second image signals; and
   the focus detection apparatus according to claim 1.

13. A focus detection method for detecting a focus state of a subject using first pixel signals and second pixel signals obtained by performing photoelectric conversion on subject light beams which have passed through different pupil regions of an imaging optical system for forming an optical image of the subject, the focus detection method comprising:
   detecting the focus state of the subject from the first pixel signals and second pixel signals;
   adding each of the first pixel signals and second pixel signals by a predetermined addition number;
   relatively shifting the first pixel signals and second pixel signals that have undergone the addition in the addition step, and calculating an evaluation value based on a contrast of a signal obtained by adding the first pixel signals and the second pixel signals after being shifted; and
   detecting a defocus amount from the evaluation value,
   wherein, in the adding step, the predetermined addition number is set in accordance with the focus state detected in the former detecting step.

* * * * *